(12) United States Patent
Vinciarelli

(10) Patent No.: US 7,920,391 B1
(45) Date of Patent: Apr. 5, 2011

(54) DOUBLE-CLAMPED ZVS BUCK-BOOST POWER CONVERTER

(75) Inventor: Patrizio Vinciarelli, Boston, MA (US)

(73) Assignee: VLT, Inc., Sunnyvale, CA (US)

( * ) Notice: Subject to any disclaimer, the term of this patent is extended or adjusted under 35 U.S.C. 154(b) by 0 days.

(21) Appl. No.: 12/501,112

(22) Filed: Jul. 10, 2009

Related U.S. Application Data

(62) Division of application No. 11/228,068, filed on Sep. 15, 2005, now Pat. No. 7,561,446.

(51) Int. Cl.
*H02M 3/335* (2006.01)
(52) U.S. Cl. .......................................................... 363/17
(58) Field of Classification Search .................. 323/222, 323/224, 282, 283; 363/16, 17
See application file for complete search history.

(56) References Cited

U.S. PATENT DOCUMENTS

| | | | |
|---|---|---|---|
| 4,533,986 A | 8/1985 | Jones | |
| 4,648,017 A | 3/1987 | Nerone | |
| 4,841,220 A | 6/1989 | Tabisz et al. | |
| 4,853,832 A | 8/1989 | Stuart | |
| 4,855,888 A | 8/1989 | Henze et al. | |
| 4,860,184 A | 8/1989 | Tabisz et al. | |
| 4,931,716 A | 6/1990 | Jovanovic et al. | |
| 5,508,905 A | 4/1996 | Reichard | |
| 5,615,093 A | 3/1997 | Nalbant | |
| 5,625,545 A | 4/1997 | Hammond | |
| 5,682,303 A | 10/1997 | Goad | |
| 5,767,660 A | 6/1998 | Schmidt | |
| 5,786,992 A | 7/1998 | Vinciarelli et al. | |
| 5,999,417 A | 12/1999 | Schlecht | |
| 6,222,742 B1 | 4/2001 | Schlecht | |
| 6,340,851 B1 | 1/2002 | Rinaldi et al. | |
| 6,388,905 B2 | 5/2002 | Nakagawa | |
| 6,424,549 B1 | 7/2002 | Gattavari et al. | |
| 6,511,764 B1 | 1/2003 | Marten | |
| 6,538,414 B1 | 3/2003 | Tsuruga et al. | |
| 6,608,770 B2 | 8/2003 | Vinciarelli | |
| 6,643,158 B2 | 11/2003 | McDonald et al. | |
| 6,650,560 B2 | 11/2003 | McDonald et al. | |
| 6,788,033 B2 | 9/2004 | Vinciarelli | |
| 6,853,167 B2 | 2/2005 | Elek et al. | |
| 6,856,283 B2 | 2/2005 | Jacobson et al. | |

(Continued)

OTHER PUBLICATIONS

Baker, "High Frequency Power Conversion With FET-Controlled Resonant Charge Transfer," PCI Proceedings, Apr. 1983.

(Continued)

*Primary Examiner* — Bao Q Vu
*Assistant Examiner* — Jue Zhang
(74) *Attorney, Agent, or Firm* — Fish & Richardson P.C.

(57) ABSTRACT

A transformer-coupled buck-boost DC-DC power converter is disclosed. An active clamp circuit is provided to form a resonant circuit with the transformer to control the slew rate of the secondary current and allow the secondary switch to be turned ON at conditions of zero voltage and relatively low current. The characteristic resonant period of the active clamp transformer circuit may be less than the minimum converter operating period. A winding of the transformer is shunted during a clamp phase to retain energy in the transformer. ZVS phases are provided to reduce switching losses when switches in the converter are turned ON. An energy-storage phase may be varied to control the amount of energy stored per operating cycle. An input-storage phase may transfer energy to the clamp capacitor during a series of converter operating cycles and transfer said energy to the secondary during different converter operating cycles.

18 Claims, 11 Drawing Sheets

U.S. PATENT DOCUMENTS

| | | | |
|---|---|---|---|
| 6,992,907 B2 | 1/2006 | Zhang | |
| 6,995,987 B2 * | 2/2006 | Song et al. | 363/17 |
| 7,170,764 B2 | 1/2007 | Vinciarelli | |
| 7,170,767 B2 | 1/2007 | Bixel | |
| 7,212,419 B2 | 5/2007 | Vinciarelli | |
| 2001/0036088 A1 | 11/2001 | Wittenbreder | |
| 2007/0159862 A1 | 7/2007 | Vinciarelli | |

OTHER PUBLICATIONS

Bo Yang et al., "LLC Resonant Converter for Front End DC-DC Conversino," CPES Seminar 2001, Blacksburg, VA, Apr. 2001.

Bo Yang et al., "Low Q Characteristic of Series Resonant Converter and Its Application," CPES Seminar 2001, Blackburg, VA, Apr. 2001.

Divan, "Design Considerations for Very High Frequency Resonant Mode DC/DC Converters," IEEE Transactions on Power Electronics, vol. PE-2, No. 1, Jan. 1987.

Erickson and Maksimovic, "fundamentals of Power Electronics," $2^{nd}$ Edition, Kluwer Academic Publishers, 2001.

Hua et al., "Novel Zero-Voltage Transition PWM Converters," IEEE Transactions on Power Electronics, vol. 9, No. 2, Mar. 1994, p. 605.

Mweene et al, "A High-Efficiency 1.5 kW, 390-50V Half-Bridge Converter Operated at 100% Duty Ratio," APEC '92 Conference Proceedings, 1992, pp. 723-730.

Palz, "Stromversorgung von Satelliten—Wanderfeldröhren hoher Leistung," ("Power Supply for Satellites—High Capacity Traveling-Wave Tubes"), Siemens Zeitschrift, vol. 48, 1974, pp. 840-846.

Severns and Bloom, "Modern DC-to-DC Switchmode Power Conversion Circuits," ISBN 0-442-2396-4, pp. 78-111, 1985.

Severns and Bloom, *ibid*, at, *e.g.*, pp. 114-117, 136-139, 1985.

Steigerwals, "A Comparison of Half-Bridge Resonant Converter Topologies," IEEE Transactions on Power Electronics, vol. 2, No. 2, Apr. 1988.

SynQor, "Preliminary Tech Spec, Narrow Input, Isolated DC/DC Bus Converter," SynQor Document No. 005-2BQ512J, Rev. 7, Aug. 2002.

Watson, New Techniques in the Design of Distributed Power System, etds@Vt,UVT, Aug. 7, 1998, p. 88-115.

Jitaru, "High efficiency flyback converter using synchronous rectification," APEC 2002, vol. 2, pp. 867-871.

Dalal, "Design Considerations for Active Clamp and Reset Technique," 1996 Unitrode Design Seminars, SEM1100.

\* cited by examiner

DOUBLE-CLAMPED ZVS BUCK-BOOST POWER CONVERTER

RELATED APPLICATIONS

This application is a divisional of and claims priority to U.S. patent application Ser. No. 11/228,068, titled "DOUBLE-CLAMPED ZVS BUCK-BOOST POWER CONVERTER", filed Sep. 15, 2005. The contents of the above application is incorporated herein by reference.

TECHNICAL FIELD

This invention relates to DC-DC switching power conversion, and more particularly to DC-DC switching power converters in which voltage transformation is accomplished by means of a transformer.

BACKGROUND

A variety of non-isolated and transformer-isolated buck-boost switching power converters are known in the art. In general, a buck-boost switching power converter can generate a pre-determined output voltage as its input voltage varies over a range that includes values both less than and greater than its output voltage (in the case of transformer-isolated buck-boost converters, the ratio of input to output voltage is normalized to the transformer turns ratio). In contrast, the maximum or minimum converter output voltage may be limited by the value of input voltage in other converter topologies (e.g., in a canonical buck converter the normalized output voltage cannot be greater than the input voltage; in a canonical boost converter the normalized output voltage cannot be less than the input voltage).

Flyback converters and isolated Cuk converters are known examples of isolated buck-boost switching power converters. Flyback converters using active clamp circuitry are known (see, e.g., Jitaru, "High efficiency flyback converter using synchronous rectification," APEC 2002, Volume 2, pp. 867-871; Dalal, "Design Considerations for Active Clamp and Reset Technique," 1996 Unitrode Design Seminars, SEM1100).

Using a switch to retain energy in an inductive element as a means of reducing noise and switching losses in switching power converters is described in Prager et al, "Loss and Noise Reduction in Power Converters," U.S. Pat. No. 6,522,108, issued Feb. 18, 2003, assigned to the same assignee as this application and incorporated in its entirety by reference. A buck-boost converter incorporating switches to retain energy in an inductive element and control techniques for operating the converter is described in Vinciarelli, "Buck-boost DC-DC switching power conversion," U.S. Pat. No. 6,788,033, issued Sep. 7, 2004, assigned to the same assignee as this application and incorporated in its entirety by reference.

SUMMARY

In general, one aspect features an apparatus for converting power from an input source at an input voltage for delivery to a load at an output voltage. The apparatus may include a transformer having a primary winding and a secondary winding. Secondary circuit elements may be connected to the secondary winding are be adapted to deliver power to the load at the output voltage. Active clamp circuitry may be connected to the primary winding and may include a clamp switch and a clamp capacitor. A plurality of primary switches may be connected to the primary winding. A switch controller may be adapted to operate the clamp switch and the primary switches in a series of converter operating cycles. Each converter operating cycle may include an energy-storage phase, an energy-transfer phase, and a clamp phase. The primary winding may be connected to the input source during the energy-storage phase. The energy-storage phase may be characterized by a transfer of energy from the input source to the transformer with an average value of primary current flowing in the primary winding having a first polarity. The energy transfer phase may be characterized by a transfer of energy from the transformer to the load. The primary winding of the transformer may be clamped during the clamp phase. The clamp phase may be characterized by essentially zero voltage across the primary winding and an average value of current flowing in the primary winding having a second polarity which is opposite of the first polarity.

Implementations of the apparatus may include one or more of the following features. One or more of the converter operating cycles may include an input-storage phase during which the primary winding is connected to the input source and to the clamp capacitor and which may be characterized by a transfer of energy between the input source, the transformer, and the clamp capacitor. The energy transfer phase may include a transfer of energy from the clamp capacitor to the secondary circuit elements. The energy transfer phase may be further characterized by a resonant circuit formed between a primary-referenced leakage inductance and the clamp capacitor having a resonant period, $T_R$, which is greater than the minimum converter operating period, $T_{oc-min}$. The energy transfer phase may be further characterized by a resonant circuit formed between a primary-referenced leakage inductance and the clamp capacitor and having a resonant period, $T_R$, which is less than the minimum converter operating period, $T_{oc-min}$. The primary switches may include a first switch connected between a first terminal of the input source and a first end of the primary winding; a second switch connected between a second terminal of the input source and the first end of the primary winding; and a third switch connected between a second end of the primary winding and the second terminal of the input source. The first switch and the third switch may be ON during the energy-storage phase. The clamp circuitry may be connected between the second end of the primary winding and the second terminal of the input source and the first switch and the clamp switch may be ON during the input-storage phase. The clamp circuitry may be connected between the second end of the primary winding and the second terminal of the input source and the clamp switch and the second switch may be ON during the energy transfer phase. The third switch and the second switch may be ON during the clamp phase. The secondary circuit elements may include a secondary switch and the switch controller may operate the secondary switch to conduct a secondary current between the secondary winding and the load during the energy transfer phase. The energy transfer phase may begin after the end of the energy-storage phase. The energy transfer phase may begin after the end of the input-storage phase. The clamp phase may begin after the end of the energy transfer phase. The converter operating cycle may include a zero-voltage switching phase at the end of the energy-storage phase. The converter operating cycle may include a zero-voltage switching phase at the end of the input-storage phase. The converter operating cycle may include a zero-voltage switching phase at the end of the energy transfer phase. The converter operating cycle may include a zero-voltage switching phase at the end of the clamp phase. The control circuitry may sense the output voltage and vary (a) the duration of the energy-storage phase, or (b) the duration of the clamp phase, or (c) the durations of each of the energy-storage phase and of the clamp phase as a means of maintaining the output voltage at a pre-determined value. The converter operating cycle may have a converter operating period, $T_{oc}$, which is essentially constant, and the selected control variable may be (a) the duration of the energy-storage phase. The duration of the clamp phase may be essentially constant and the selected control variable may be (a) the duration of the energy-storage phase. The selected control variables may be (c) the duration of the energy-storage phase and the duration of the clamp phase and the switch controller may vary the duration of the energy-storage phase in inverse relation to the magnitude of the input voltage and may vary the duration of the clamp phase to control the output voltage. The selected control variables may be (c) the duration of the energy-storage phase and the duration of the clamp phase and the switch controller may control the output voltage by: (a) varying the duration of the energy-storage phase over a pre-determined range, the range having an upper limit and a lower limit, and (b) holding the duration of the clamp phase essentially constant and less than the duration of the energy-storage phase while the duration of the energy-storage phase is less than the upper limit and greater than the lower limit, and (c) varying the duration of the clamp phase while the duration of the energy-storage phase is greater than or equal to the upper limit or less than or equal to the lower limit. The duration of the clamp phase may vary from a small portion of the converter operating period at high loads to a large portion of the converter operating period at light loads. The switch controller may provide power factor correction. One or more of the converter operating cycles may include the following phases in sequence: (a) an energy-storage phase; (b) a first zero-voltage switching ("ZVS") phase that begins at the end of the energy-storage phase; (c) an energy transfer phase that begins at the end of the first ZVS phase; (d) a second ZVS phase that begins at the end of the energy transfer phase; (e) a clamp phase that begins at the end of the second ZVS phase; and (f) a third ZVS phase that begins at the end of the clamp phase. One or more of the converter operating cycles may include the following phases in sequence: (a) an energy-storage phase; (b) a first zero-voltage switching ("ZVS") phase that begins at the end of the energy-storage phase; (c) an input-storage phase that begins at the end of the first ZVS phase; (d) a second ZVS phase that begins at the end of the input-storage phase; (e) an energy transfer phase that begins at the end of the second ZVS phase; (f) a third ZVS phase that begins at the end of the energy transfer phase; (g) a clamp phase that begins at the end of the third ZVS phase; and (h) a fourth ZVS phase that begins at the end of the clamp phase. The control circuitry may sense the output voltage and as a means of maintaining the output voltage at a pre-determined value vary one or more of the following: (a) the duration of the energy-storage phase, (b) the duration of the input-storage phase, (c) the duration of the energy transfer phase, (d) the duration of the clamp phase. The clamp circuitry may be connected between the second end of the primary winding and the second terminal of the input source. A sixth switch may connect a storage capacitor in parallel with the clamp capacitor when ON and disconnect the storage capacitor from the clamp capacitor when OFF. The energy transfer phase may be further characterized by a resonant circuit formed between a primary-referenced leakage inductance and the clamp capacitor and having a resonant period $T_R$, which is less than the minimum converter operating period, $T_{oc\text{-}min}$ when the sixth switch is OFF. A seventh switch may be adapted to conduct current from the storage capacitor to the converter input when ON and block current between the converter input and the storage capacitor when OFF. The output voltage may be galvanically isolated from the input source.

In general, another aspect features an apparatus for converting power from an input source at an input voltage for delivery to a load at an output voltage, including a transformer having a primary winding, a secondary winding, and a leakage inductance, secondary circuit elements connected to the secondary winding adapted to deliver power to the load at the output voltage, active clamp circuitry connected to the primary winding including a clamp switch and a clamp capacitor, a plurality of primary switches connected to the primary winding, and a switch controller adapted to operate the clamp switch and the primary switches in a series of converter operating cycles. Each converter operating cycle may have a period $T_{oc}$ which is greater than or equal to a minimum period $T_{oc\text{-}min}$ and include an energy-storage phase and an energy transfer phase. The primary winding may be connected to the input source during the energy-storage phase which may be characterized by a transfer of energy from the input source to the transformer. The energy transfer phase may be characterized by a transfer of energy from the transformer to the load and by a transfer of energy between the transformer and the clamp capacitor. The transfer of energy between the transformer and the clamp capacitor may have a resonant period $T_R$, which is less than $T_{oc\text{-}min}$.

In general, another aspect features a method including converting power, received at an input from an input source at an input voltage, via a transformer for delivery to a load at an output voltage, in a series of converter operating cycles. Each converter operating cycle may include an energy-storage phase, an energy-transfer phase, and a clamp phase. Energy may be transferred from the input source to a primary winding of the transformer during the energy-storage phase which may be characterized by an average current having a first polarity flowing in the primary winding. Energy may be transferred from a secondary winding of the transformer to the load during the energy transfer phase which may be characterized by connecting a clamp capacitor to the transformer. The primary winding of the transformer may be clamped during the clamp phase which may be characterized by essentially zero voltage across the primary winding and an average current having a second opposite polarity flowing in the primary winding.

Implementations of the method may include one or more of the following features. The capacitance of the clamp capacitor may be set to control the slew rate of a current in the secondary winding to enable a switch connected to the secondary winding to be turned ON under conditions of essentially zero voltage and at a current less than a peak value of the current in the secondary winding. The clamp capacitor may be connected to the primary winding during the energy transfer phase. Parasitic capacitances may be charged and discharged during a first ZVS phase following the end of the energy-storage phase. Parasitic capacitances may be charged and discharged during a second ZVS phase following the end of the energy transfer phase. A resonant circuit may be formed between a primary-referenced leakage inductance of value $L_L$ and the clamp capacitor of value $C_C$, during the energy-transfer phase and may have a characteristic time constant, $T_R=\text{pi}*\text{sqrt}(L_L*C_C)$, which is less than a minimum converter operating period, $T_{oc\text{-}min}$. The converter operating cycles may include transferring energy between the input source, the transformer, and the clamp capacitor during an input-storage phase. The converter operating cycles may include transferring energy from the clamp capacitor to the secondary circuit elements during a portion of the energy transfer phase. A resonant circuit may be formed between a primary-referenced leakage inductance of value $L_L$ and the clamp capacitor of value $C_C$, during the energy-transfer phase and may have a characteristic time constant, $T_R=\text{pi}*\text{sqrt}(L_L*C_C)$, which is greater than a minimum converter operating period, $T_{oc\text{-}min}$.

Implementations of the method may include one or more of the following features. A storage capacitor may be connected in parallel with the clamp capacitor to provide a first value of effective clamp capacitance, $C_{eff}=C_{eff1}$, when the input voltage exceeds a first predetermined threshold and disconnected from the clamp capacitor to provide a second value of effective clamp capacitance, $C_{eff}=C_{eff2}$, when the input voltage is less than a second predetermined threshold. One or more of the converter operating cycles may include transferring energy between the input source, the transformer, and the effective clamp capacitance during an input-storage phase and transferring energy from the effective clamp capacitance to the secondary circuit elements during a portion of the energy transfer phase. A resonant circuit may be formed between a primary-referenced leakage inductance of value $L_L$ and the effective clamp capacitance, $C_{eff}$, during the energy-transfer phase. The resonant circuit may have a characteristic time constant, $T_R=\text{pi}*\text{sqrt}(L_L*C_{eff})$.

Implementations of the method may include one or more of the following features. The minimum converter operating period, $T_{oc\text{-}min}$ may be greater than $T_R$ when the storage capacitor is connected in parallel with the clamp capacitor and $T_R$ may be greater than $T_{oc\text{-}min}$ when the storage capacitor is disconnected from the clamp capacitor. The storage capacitor may be connected to the input and current flow in a direction from the storage capacitor to the input source may be restricted when the input voltage is less than the second predetermined threshold.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Converter Topology

Figure 1:
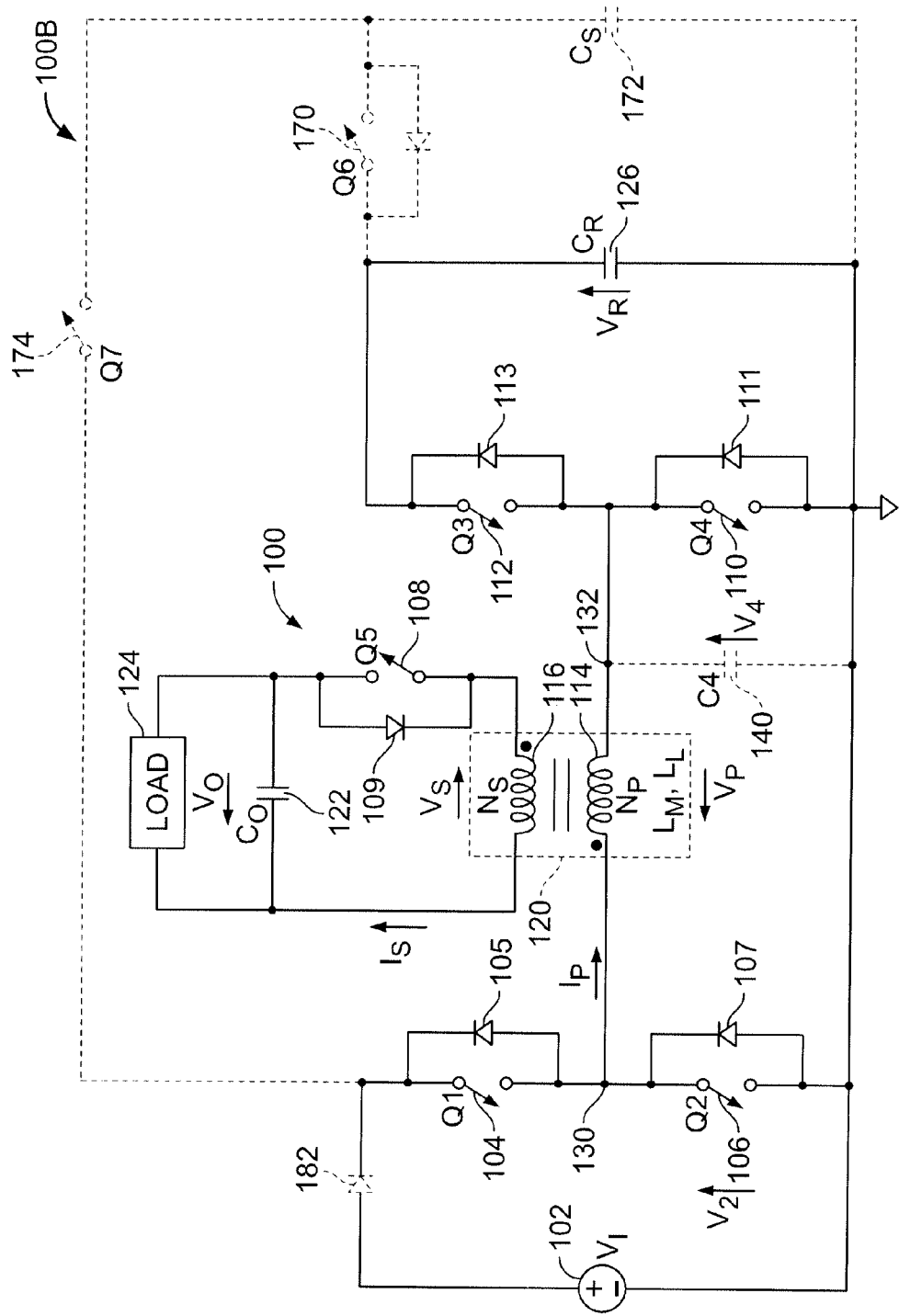
FIG. 1 is a schematic of a double-clamped buck-boost power converter.

Referring to FIG. 1, an isolated buck-boost converter 100 is shown including transformer 120, characterized by a turns ratio $N=N_S/N_P$, where $N_S$ and $N_P$ are, respectively, the number of turns in the secondary winding 116 and in the primary winding 114 of transformer 120. The transformer is also characterized by a magnetizing inductance of value, $L_M$, and primary-referenced leakage inductance of value, $L_L$, where both $L_M$ and $L_L$ may be set, by design, to pre-determined, finite, values and where, generally, the magnetizing inductance is much greater than the leakage inductance ($L_M \gg L_L$). Converter 100 includes primary switches Q1 104, Q2 106, and Q4 110 (each having a respective parallel connected diode 105, 107, 111) connected to the primary winding 114 in the circuit. Secondary switch Q5 108 and its parallel connected diode 109 are connected to the secondary winding 116. Clamp switch Q3 112 along with its associated parallel connected diode 113 and clamp capacitor $C_R$ 126 form an active clamp circuit, described below. MOSFET devices may be used for any or all of switches Q1-Q5 in which case the intrinsic body diode of the MOSFET may be used for the parallel-connected diode.

As used herein, the terms "leakage inductance" and "primary-referenced leakage inductance" shall mean the primary-referenced, uncoupled, inductance of a transformer (i.e., the inductance measured at the primary winding of the transformer with perfect short circuits across all other transformer windings). It is also to be understood that "leakage inductance" and "primary-referenced leakage inductance" may also comprise discrete or parasitic inductances that are in series with the primary winding of the transformer (either physically or by reflection from another winding).

The converter 100 receives power from input source 102 which delivers a DC input voltage, $V_I$, to the converter input. The converter delivers power to load 124 at an output voltage, Vo, which is rectified and smoothed by secondary circuitry, including secondary switch Q5 108, parallel diode 109, and output filter capacitor $C_o$ 122. In general, the magnitude of both the input voltage, $V_I$, and the load 124 may vary over a range of values.

The circuit components shown in FIG. 1 in dashed lines (capacitors $C_4$ 140, $C_s$ 172, switches Q6 170 and Q7 174, and diode 182) are optional and may be added to the basic converter topology 100 (shown in solid lines) to form a reconfigurable converter 100B as discussed in more detail below.

Figure 4:
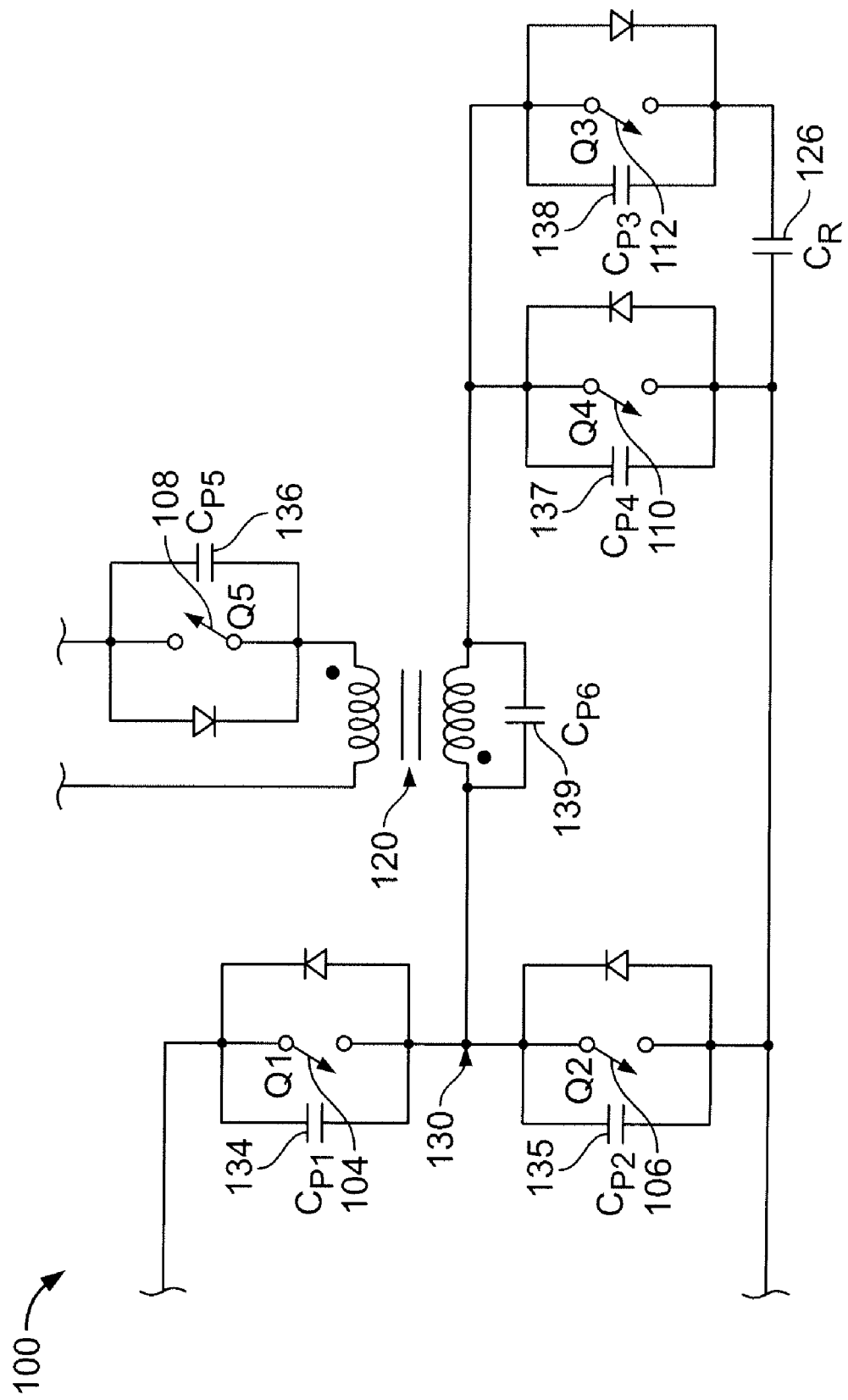
FIG. 4 shows a partial circuit model including parasitic capacitances.

Referring to FIG. 4, a partial schematic of the basic converter topology 100 shows capacitances $C_{P1}$ 134, $C_{P2}$ 135, $C_{P3}$ 138, $C_{P4}$ 137, $C_{P5}$ 136, and $C_{P6}$ 139 that are illustrative, in part, of the parasitic capacitances of the switches Q1 through Q5 and the transformer 120. An additional capacitance $C_4$ 140 may be connected across switch Q4 in the basic converter as shown in dashed lines in FIG. 1 and discussed further below.

The basic converter 100 may be operated in two different modes described in detail below. The first operating mode ("Mode 1" or "M1") may be characterized by a timing architecture that preferably includes six phases and by the clamp capacitor, $C_R$ 126 preferably having a relatively small capacitance. The second operating mode ("Mode 2" or "M2") may be characterized by a timing architecture that preferably includes eight phases and by the clamp capacitor, $C_R$ 126, preferably having a much larger capacitance. The reconfigurable converter 100B may be adapted to change between Mode 1 and Mode 2 if desired. The differences between Mode 1 and Mode 2 are discussed below.

I. Mode 1 Operation.

Figure 2A:
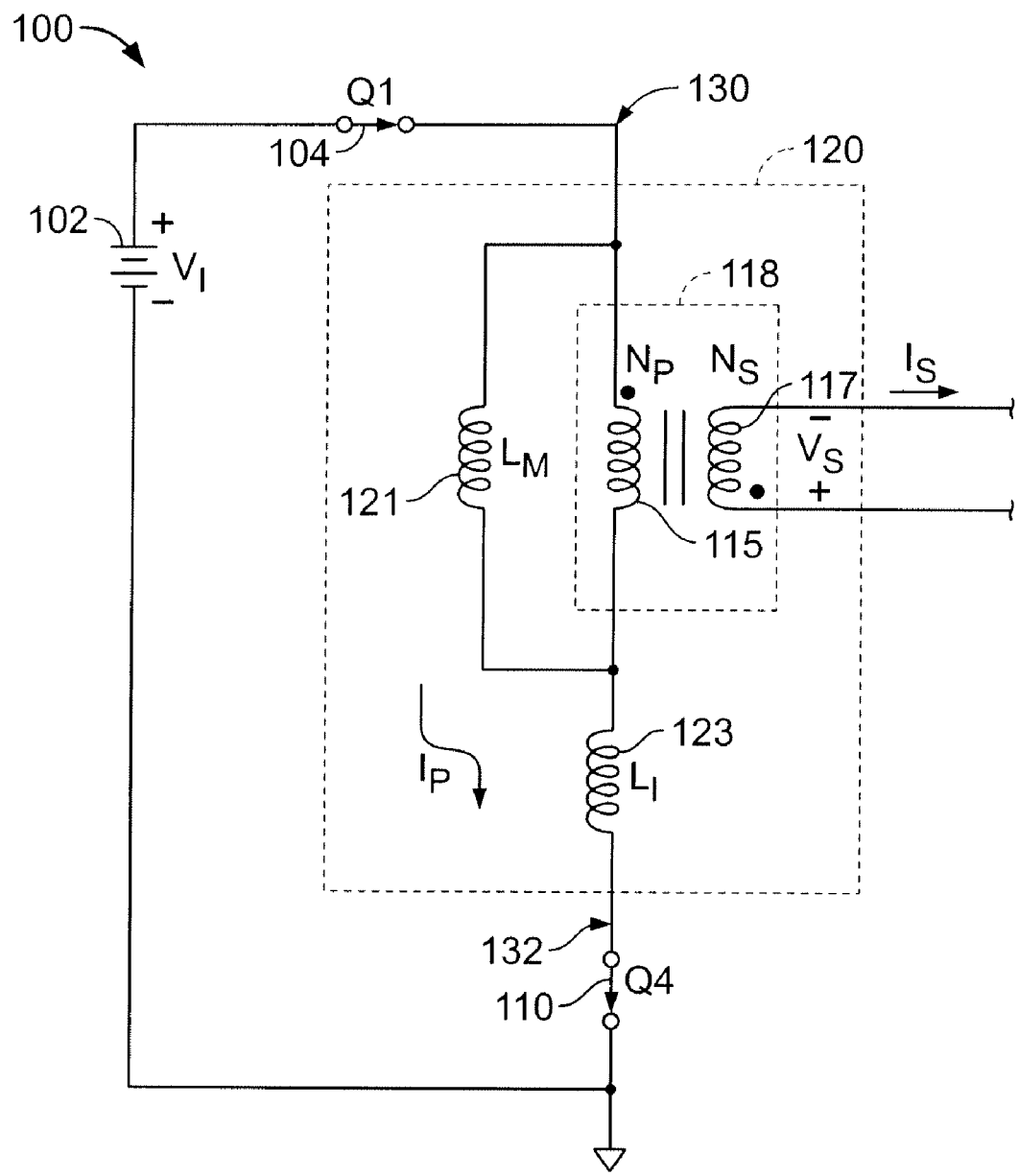
FIGS. 2A through 2D illustrate circuit configurations during different phases of an operating cycle of the converter of FIG. 1.
Figure 2B:
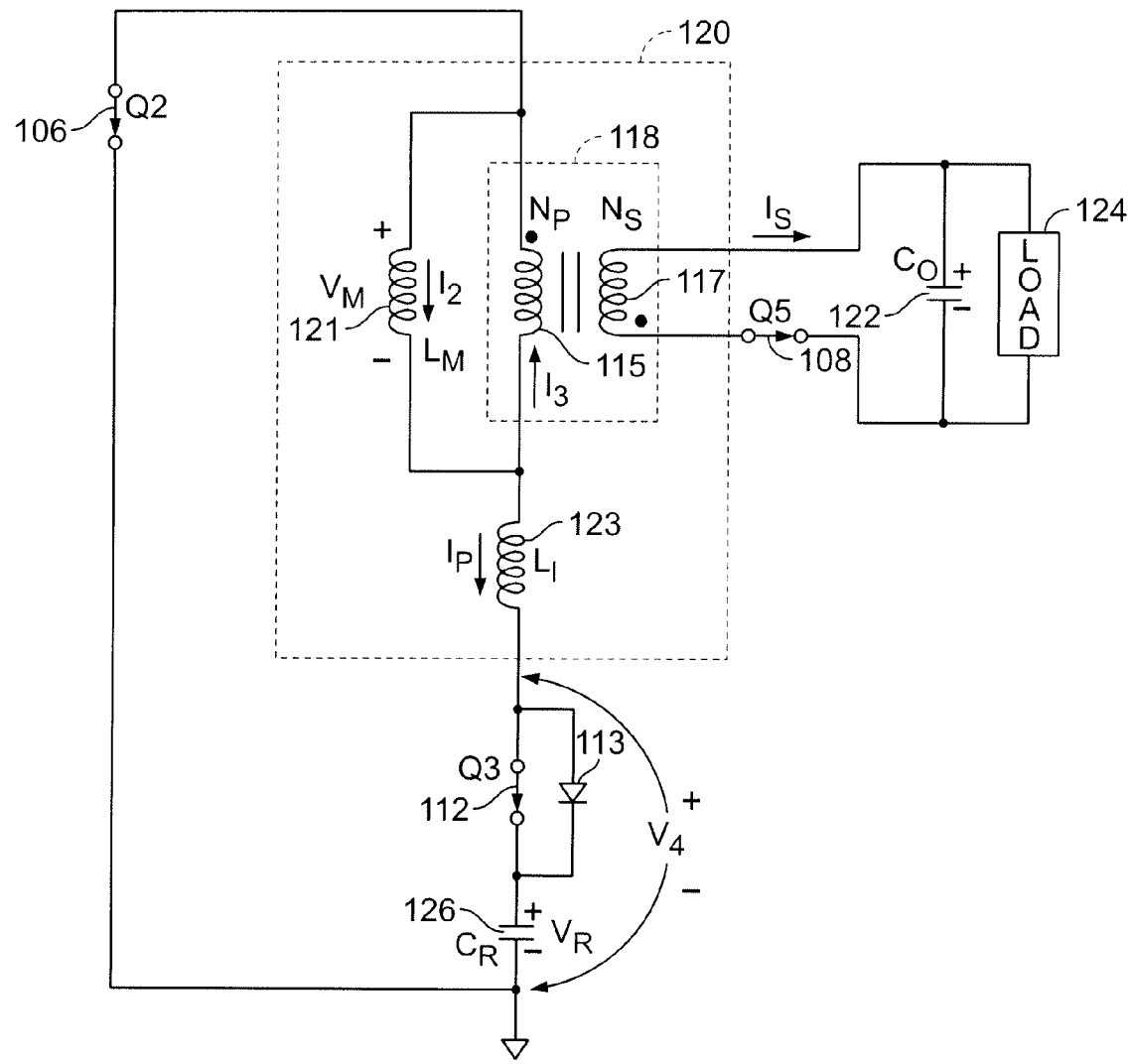
Figure 2C:
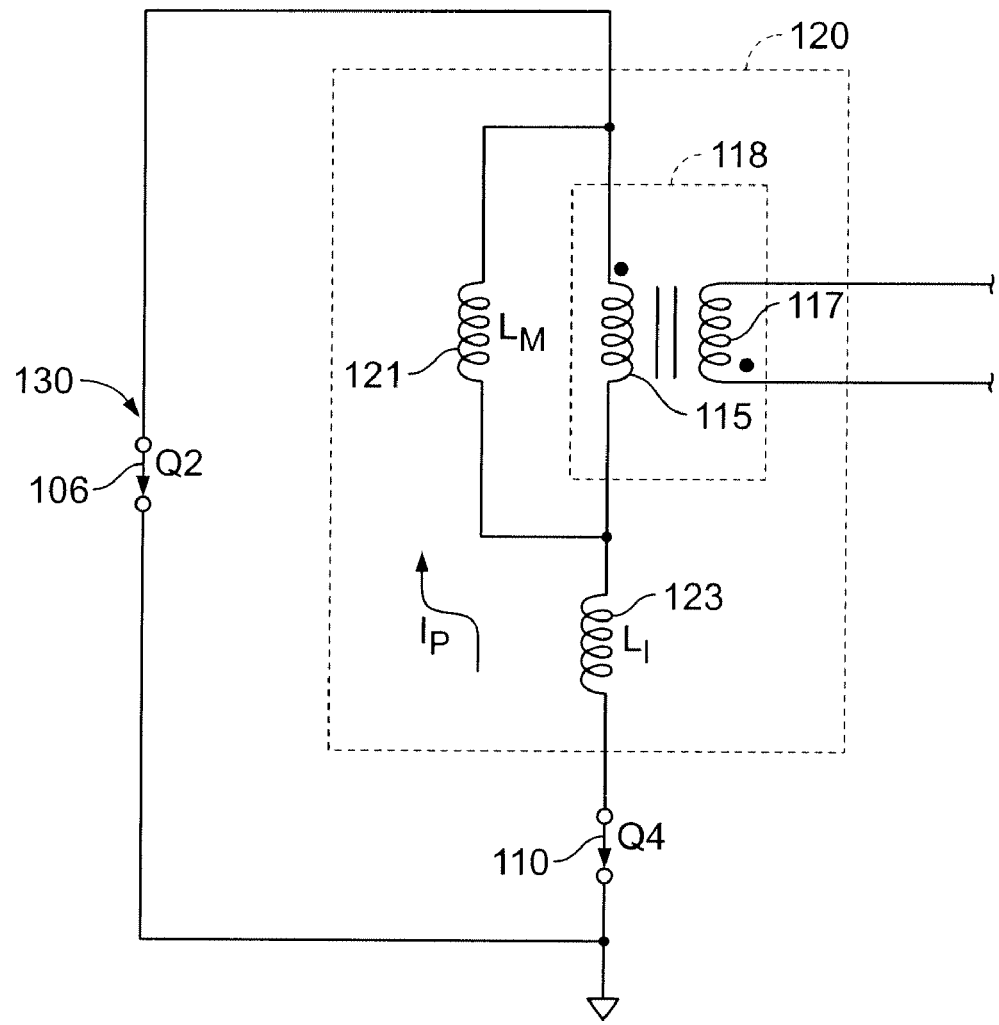

Operation of the basic converter 100 in Mode 1 will be described with reference to the schematic diagrams in FIGS. 1 and 2A through 2C and the waveforms in FIGS. 3A through 3I. In FIGS. 2A through 2C, the transformer 120 is replaced with a simplified transformer equivalent circuit comprising an ideal transformer 118 having a turns ratio equal to $N=N_S/$ $N_P$; a primary-referenced magnetizing inductance, $L_M$ 121; and a primary-referenced leakage inductance, $L_L$ 123. The following description assumes that the value of the output filter capacitor $C_o$ 122 is sufficiently large to maintain the converter output voltage, Vo, at an essentially constant level.

A. Mode 1 Timing Architecture.

Waveforms for the timing architecture of the converter 100 of FIG. 1 operating in Mode 1 are shown in FIGS. 3A-3I. In the Figures, a converter operating cycle, having a converter operating period of duration $T_{M1}$, is shown having a series of phases, described in detail below. Each phase in the converter operating cycle may be characterized by its function (e.g., enabling storage of energy in the transformer) and the states of the switches Q1-Q5 during the phase. A preferable structural feature of the converter in Mode 1 (as compared to Mode 2) is that a relatively small clamp capacitor $C_R$ 126 is used in Mode 1, as described below. However, the Mode 1 timing architecture may be used regardless of the size of the clamp capacitor.

1. Energy Storage Phase.

Figure 3A:
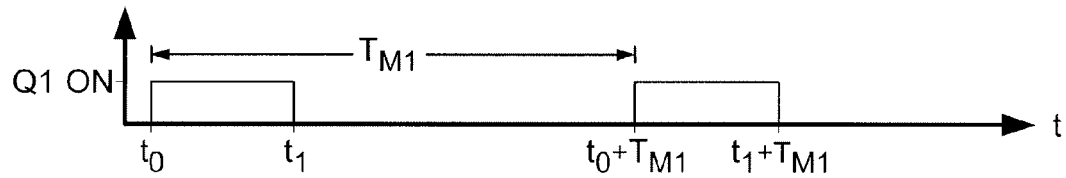
FIGS. 3A through 3I show operating waveforms for the converter of FIG. 1 operating in a first operating mode.
Figure 3B:
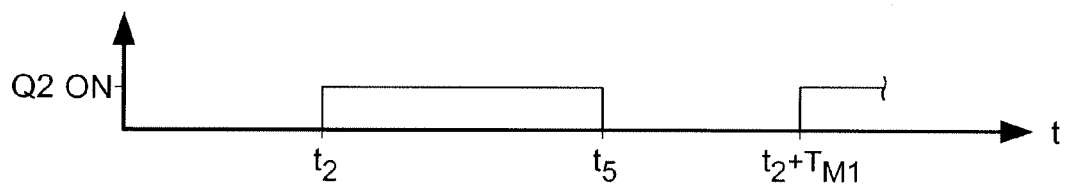
Figure 3C:
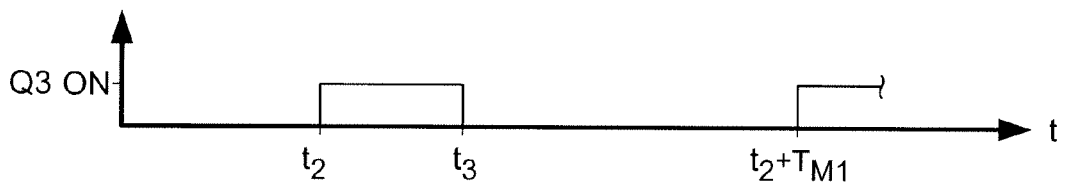
Figure 3D:
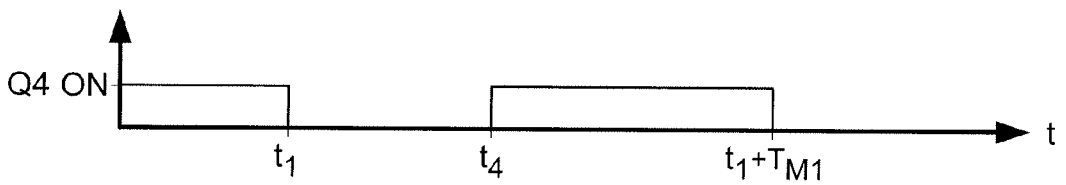
Figure 3E:
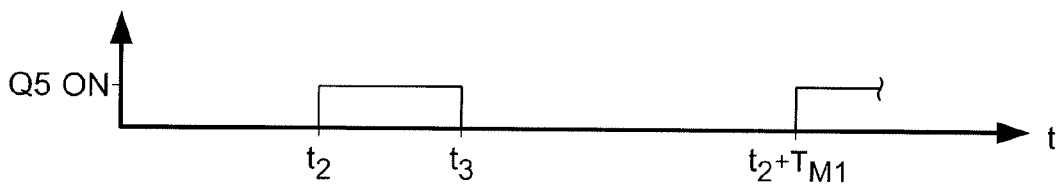
Figure 3F:
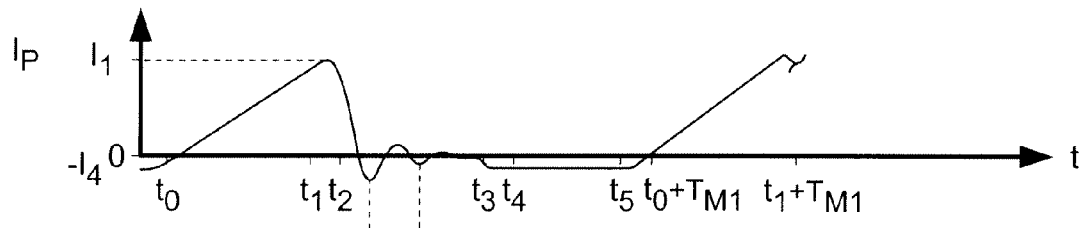

At time $t_o$, switch Q4 may remain ON (FIG. 3D) from the last phase of the previous converter operating cycle and switch Q1 may be turned ON (FIG. 3A), initiating an energy-storage phase. During the energy-storage phase, a primary current $I_P$ (FIG. 3F) flows from the input source 102 into the primary winding 114 of the transformer 120. An idealized equivalent circuit of the basic converter 100 during the energy-storage phase is shown in FIG. 2A. As shown in FIG. 3F, the primary current ramps up during the energy-storage phase reaching a maximum current, $I_p=I_1$, shortly after switches Q1 and Q4 are turned OFF at the end of the energy-storage phase (e.g., at time $t_1$). The primary current will continue to ramp up after switches Q1 and Q4 are turned OFF (during the early portion of ZVS phase A) for as long as the primary voltage Vp is positive as shown in FIG. 3F. The primary current, $I_P$, is positive and flows in the direction of the arrow (FIG. 2A) at time $t_1$. An average of the primary current, taken over the duration of the energy-storage phase, is positive using the conventions shown in FIG. 1. With switch Q5 OFF and the polarities of the transformer windings as indicated, and ignoring leakage and other parasitic currents, the secondary current, $I_S$, is zero throughout the energy-storage phase of the operating cycle.

2. ZVS Phase A.

Switches Q1 104 and Q4 110 may be turned OFF at or shortly after time $t_1$, terminating the energy-storage phase, blocking further energy transfer between the input source and the transformer, and initiating zero-voltage switching ("ZVS") phase A of the converter operating cycle. As used herein, ZVS refers to partially or fully charging and discharging circuit capacitances to achieve a reduction or complete elimination of the voltage across a switch as a means of reducing switching losses when the switch is turned ON. When switch Q1 turns OFF, the positive flow of current in the primary winding, $I_P$, charges and discharges the parasitic capacitances associated with node 130, including, with reference to FIG. 4, the parasitic capacitances $C_{P1}$ and $C_{P2}$ of switches Q1 and Q2, causing the voltage V2 to decline towards zero in preparation for ZVS turn ON of switch Q2. When Q4 turns OFF, the positive flow of current $I_P$ charges and discharges the capacitances associated with node 132 including, with reference to FIG. 4, the parasitic capacitances $C_{P3}$ and $C_{P4}$ of switches Q3 and Q4, and optional capacitance C4 140 in FIG. 1, causing the voltage V4 at node 132 to increase in preparation for ZVS turn ON of switch Q3.

At time $t_2$, the voltage V2 (FIG. 3H) at node 130 is clamped to essentially zero volts by conduction of diode 107 and, at approximately the same time, the voltage V4 (FIG. 3I) at node 132 is clamped to the clamp voltage, $V_R$, across clamp capacitor, $C_R$ 126, by conduction of diode 113. As will be discussed below, the clamp voltage, $V_R$, is essentially equal to the primary-reflected value of the output voltage, $V_o$, i.e. $V_R \approx V_o/N$. Therefore, at time $t_2$ the secondary voltage, $V_S$ (FIG. 1), is negative and essentially equal to $V_o$ and the voltage across Q5, and its associated parasitic capacitance $C_{P5}$ 136 (FIG. 4), is also approximately zero.

As the capacitances at nodes 130 and 132 charge and discharge during ZVS phase A, the voltage, $V_P$, across the primary winding will vary from an initial positive value at the beginning of the phase to a negative value at the end of the phase. Thus, as shown in FIG. 3F, the primary current, $I_P$, will continue to increase during a first portion of ZVS phase A and will decline during the remainder of the phase.

3. Energy Transfer Phase.

At about time $t_2$, switches Q2, Q3, and Q5 may be turned ON and switches Q1 and Q4 may be kept OFF (continuing to block energy transfer between the input source and the transformer), initiating an energy-transfer phase of the converter operating cycle. Because the voltage across each of switches Q2, Q3, and Q5 is essentially zero at time $t_2$, the switches turn ON essentially without loss.

FIG. 2B is a circuit model of the basic converter 100 during the energy-transfer phase. With reference to FIGS. 2B and 3, after time $t_2$ the output voltage $V_o$ is reflected back into the primary of the ideal transformer 118 as a negative voltage $V_M = -V_o/N$. If there were no transformer leakage inductance, $L_L$ 123, the energy stored in the magnetizing inductance, $L_M$ 121, of the transformer would immediately commutate into the secondary winding and transfer energy toward the load. Owing to the presence of leakage inductance 123, however, instantaneous commutation to the secondary is impeded.

Referring to FIG. 2B, the leakage inductance $L_L$ 123 and the clamp capacitor $C_R$ 126 form a damped resonant circuit (the damping being caused by the presence of circuit resistances (not shown) including, e.g., the resistances of switches Q2, Q3, and Q5 and the transformer windings). As noted earlier, the inductance $L_L$ of FIGS. 1 and 2B may comprise the primary-referenced leakage inductance of the transformer alone or may additionally comprise an inductance connected in series with transformer windings.

As illustrated in FIG. 3F, during the period following time $t_2$ a damped resonant current, $I_P$, flows in the primary winding. The secondary current shown in FIG. 3G, $I_S = I_3/N = (I_2 - I_P)/N$, comprises: (1) a trapezoidal component, indicated between times $t_2$ and $t_3$ in FIG. 3G by a dashed line, associated with commutation of magnetizing energy into the secondary (i.e., current $I_2/N = I_1/N - (N \cdot V_o)(t-t_2)/L_M$, where $I_1 = I_P(t_2)$ is the peak value of the primary current, $I_P$, at time $t_2$) and (2) an oscillatory component corresponding to the secondary-reflected value of the primary current $I_P$ flowing in the primary-referenced leakage inductance $L_L$. The net effect is a rise in secondary current $I_S$ with a controlled slew rate from an initial value of zero at time $t_2$. Therefore, at about time $t_2$ switch Q5 may be turned ON under essentially zero-current and essentially zero-voltage conditions. In less ideal embodiments, switch Q5 may be turned ON at a current less than the peak value.

Figure 3G:
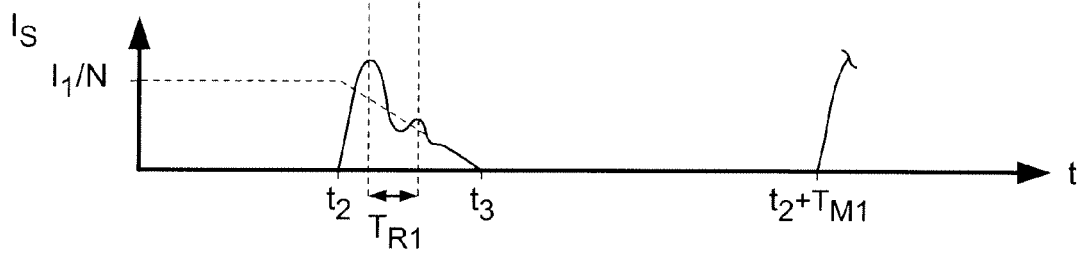
Figure 3H:
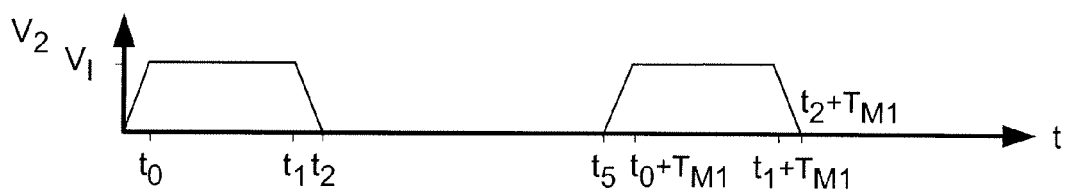
Figure 3I:
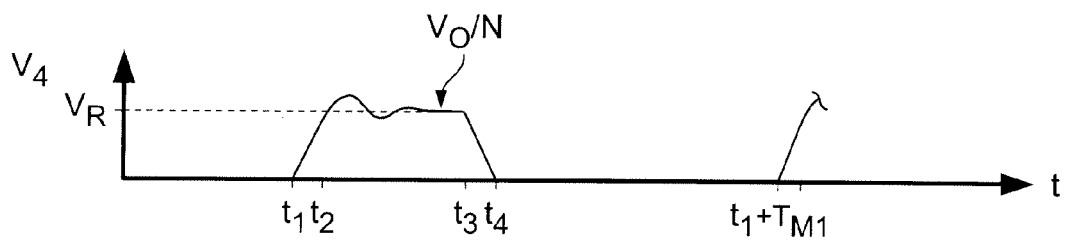

The voltage across Q4 ($V_4$, node 132) is shown in FIG. 3I. During the energy-transfer phase (i.e., the interval between times $t_2$ and $t_3$), the primary winding 114 (FIG. 1) is effectively connected in parallel with the clamp capacitor $C_R$. Therefore, as time $t_3$ approaches, voltage $V_4$ approaches a steady-state value essentially equal to the primary-reflected value of the output voltage $V_o$, i.e. $V_R \approx V_4 = V_o/N$.

As illustrated in FIG. 3G, the resonant period, $T_{R1}$, of the resonant circuit formed by the clamp capacitor $C_R$ and the leakage inductance $L_L$ preferably is relatively short compared to the converter operating period, $T_{M1}$, in Mode 1. As a result, energy transferred from the leakage inductance to the clamp capacitor is essentially released to the secondary prior to the end of the energy-transfer phase. In the absence of the clamp capacitor, the leakage inductance would, at time $t_2$, resonate with the parasitic capacitance of node 132, resulting in a relatively high frequency and high amplitude oscillation, producing undesirable high-frequency noise and dissipation of energy stored in the transformer leakage inductance. On the other hand, if the value of $C_R$ was made relatively much larger so that the resonant period, $T_{R1}$, is long relative to the operating period of the converter, $T_{M1}$, (as in the case of a flyback converter with active clamp) a circulating current would flow in switch Q3 112 throughout the entire duration of the energy-transfer phase causing dissipation. The optimal value of $C_R$ for Mode 1 operation may be chosen to limit the slew rate of the secondary current, $I_S$, and to be just large enough to enable Q5 to be turned ON after Q1 and Q4 are turned OFF, but before $I_S$ reaches its peak value. This is particularly important in low output voltage converters where the forward voltage drop of the body drain diode of switch Q5 is much larger than the voltage drop across switch Q5 in its ON state. In such low output voltage applications, slew rate limiting of $I_S$ by a suitably chosen value of clamp capacitance $C_R$ may be used to optimize converter efficiency. In general, the value of $C_R$ is best determined empirically depending on the specific requirements of the application, including choice of operating frequency and transformer leakage inductance.

4. ZVS Phase B.

At time $t_3$ the primary current $I_P$ is essentially zero; the secondary current, $I_S$, has declined to zero; and the voltage across open switch Q4 is essentially equal to $V_4 = V_o/N$. Switches Q5 and Q3 may be turned OFF at or shortly after time $t_3$, initiating ZVS phase B of the converter operating cycle.

During ZVS phase B (i.e., the interval between times $t_3$ and $t_4$), the capacitance at node 132 (FIGS. 1, 4) discharges resonantly back through the transformer primary inductance ($L_{PRI} \approx L_M + L_L$). The capacitance at node 132 may consist entirely of parasitic capacitances or, as illustrated in FIG. 1, it may comprise additional capacitance in the form of a discrete capacitor 140 connected across switch Q4 (e.g., capacitor $C_4$ 140 shown in dashed lines in FIG. 1).

At time $t_4$, a negative current, $I_P$, flows in the primary winding of the transformer and as the voltage $V_4$ at node 132 attempts to reverse in polarity, diode 111 conducts, clamping the voltage $V_4$ to essentially zero volts in preparation for ZVS turn ON of switch Q4 and ending ZVS phase B.

5. Clamp Phase.

At about time $t_4$, switch Q4 is turned ON (under ZVS conditions) to form a short circuit (in conjunction with switch Q2 which remains ON from ZVS phase B) across the primary winding, initiating a clamp phase of the converter operating cycle. A model of the basic converter during this phase is shown in FIG. 2C. During the clamp phase, a winding of the transformer is shunted by a low resistance shunt path which clamps the voltage across the winding to essentially zero volts while carrying a current flowing in the winding, e.g., switches Q2 and Q4 form a short circuit across the transformer primary winding. As shown in FIG. 3F, a current $(I_P = -I_4)$, is flowing in the primary winding at time $t_4$ at the beginning of the clamp phase (the "initial current"). The short duration of the clamp phase and the very low resistance of the shunt path (e.g. the ON resistance of switches Q2 and Q4) minimize dissipation for the energy stored in the transformer, thereby allowing energy to be retained in the transformer until the end of the clamp phase when switch Q2 is turned OFF. Thus, the current flowing in the clamped winding at the end of the clamp phase (the "remaining current") may be essentially equal to the initial current (as exemplified in FIG. 3F by the lack of change in the current $(I_P = -I_4)$ during the clamp phase from time $t_4$ to time $t_5$). An average of the primary current, taken over the duration of the clamp phase, has a negative polarity using the conventions shown in FIG. 1.

Although the remaining current is shown having essentially the same absolute value as the initial current in FIG. 3F, dissipation due to circuit resistances will generally cause a reduction in current. As explained below, the remaining current need only be sufficient to partially or completely charge and discharge the capacitances at node 130 for the purpose of providing ZVS for switch Q1 during turn ON, allowing for partial dissipation in some ZVS embodiments or complete dissipation in non-ZVS embodiments. The remaining current therefore may have an absolute value that is greater than zero or substantially the same as the initial current.

6. ZVS Phase C.

At the end of the clamp phase (time $t_5$), switch Q2 may be turned OFF initiating ZVS phase C of the converter operating cycle. The remaining current, i.e., the negative current flowing in the shunted transformer primary winding at the time, $t_5$, when switch Q2 is turned OFF, charges and discharges the parasitic capacitances associated with node 130, causing the voltage $V_2$ to increase. At time $t_o + T_{M1}$, the voltage $V_2$ is clamped by diode 104 to be essentially equal to the input source voltage $V_I$, leaving the voltage across Q1 essentially zero in preparation for ZVS turn ON of switch Q1.

In order to ensure that the voltage across switch Q1 can be brought to zero, there must be sufficient negative current flowing in the transformer primary winding at the beginning of the clamp phase at time $t_4$, which means that there must be sufficient energy stored in the capacitance at node 132 at the beginning of ZVS phase B at time $t_3$ to ensure that the energy stored in the transformer at time $t_4$ (i.e., the beginning of the clamp phase) is sufficient to enable the parasitic capacitance at node 130 to be charged to a voltage essentially equal to $V_I$. In some cases the parasitic capacitance at node 132 may be sufficient to ensure this; in other cases additional capacitance (e.g. capacitor $C_4$ 140 in FIG. 1) may be added at node 132.

Switch Q1 is turned on again at the end of ZVS phase C (time $t_o + T_{M1}$), initiating the beginning of a new energy-storage phase of a new converter operating cycle. Because switch Q1 turns ON at zero voltage, it does so essentially without loss.

The next converter operating cycle in Mode 1 proceeds through the same six phases described above: an energy-storage phase; ZVS phase A; an energy-transfer phase; ZVS phase B; a clamp phase; and ZVS phase C. Because the converter is a buck-boost converter that comprises both an active clamp circuit and a clamp phase, and because all of the switches in the converter may be switched ON at zero-voltage, thereby reducing switching losses, the converter of FIG. 1, operated in Mode 1 as shown in FIG. 3, may be referred to as a "double-clamped ZVS buck-boost" converter.

B. Mode 1 Switch Controller.

Figure 5:
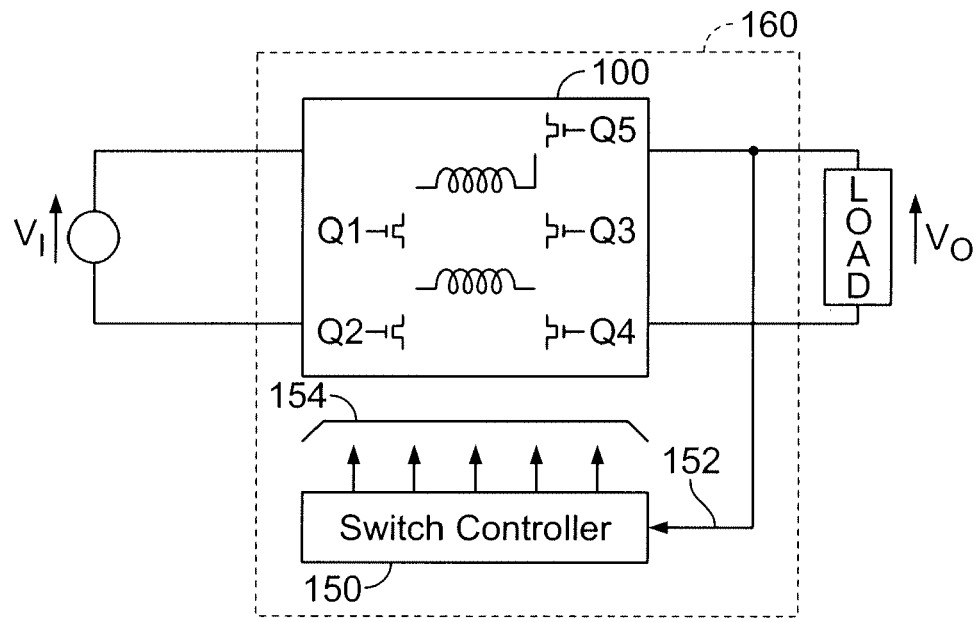
FIG. 5 shows a power converter comprising a double-clamped buck-boost power converter and a switch controller.

FIG. 5 shows a power converter 160 comprising an isolated buck-boost converter 100, of the kind shown in FIG. 1 and described above, and a switch controller 150 for controlling the switches Q1 104, Q2 106, Q3 112, Q4 110 and Q5 108 within the converter 100 (e.g., as a means of controlling the converter output voltage $V_o$). In the power converter of FIG. 5 the switches are shown to be MOSFET switches.

In operation the switch controller 150 may sense the value of the output voltage $V_o$, e.g., by means of sense connection 152, and control the relative timing of the ON and OFF periods of the switches Q1-Q5 in order to maintain $V_o$ at some pre-determined set-point value. The switch controller 150 may connect to the gate control terminals of the MOSFET switches by means of gate drive connections 154. Because the output voltage $V_o$ and the input voltage, $V_I$, may be galvanically isolated from each other by transformer 120, the switch controller 150 may also comprise isolation circuitry (e.g., transformer coupling, not shown).

For a given input voltage, $V_I$, the output voltage, $V_o$, may be controlled by varying either or both of two control variables: (a) the duration of the energy-storage phase (as defined above, the energy-storage phase is the period during which switches Q1 and Q4 are ON and switches Q2, Q3, and Q5 are OFF, between times $t_o$ and $t_1$ in FIG. 3A-3I); and (b) the duration of the clamp phase (as defined above, the clamp phase is the period during which switches Q2 and Q4 are ON and switches Q1, Q3, and Q5 are OFF, between times $t_4$ and $t_5$ in FIGS. 3A-3I). However, for any particular converter operating period, $T_{M1}$, power transfer between the input source and load may be maximized by increasing the duration of the energy-storage phase making it relatively long compared to the duration of the clamp phase, which may be minimized.

In a preferred Mode 1 embodiment, the converter may be operated at an essentially constant converter operating period, $T_{M1}$. The output voltage, $V_o$ may be controlled by varying the duration of the energy-storage phase. The converter operating period may be held constant by varying the duration of the clamp phase to make up for the difference between the operating period, $T_{M1}$, and the combined durations of the remainder of the phases. An alternative control strategy may vary the length of the energy-storage phase in inverse proportion (or other inverse relation) to the input source voltage (as a way of keeping the amount of energy stored during the energy-storage phase essentially constant) and may vary the duration of the clamp phase to regulate the output voltage. Another alternative control strategy may include: (1) varying the duration of the energy-storage phase within a range and holding the duration of the clamp phase essentially constant and less than the duration of the energy-storage phase, while the duration of the energy-storage phase remains within and not at a limit of the range, and (2) varying the duration of the clamp phase if the duration of the energy-storage phase reaches or extends beyond a lower limit of the range.

In a preferred Mode 1 embodiment, switch Q1 (FIG. 1) may be turned ON by the switch controller 150 (FIG. 5), at a time (e.g., time $t_o$, FIGS. 3A-3I) when switch Q4 is ON and switches Q2, Q3 and Q5 are OFF, to initiate an energy-storage phase (as described above) and switches Q1 and Q4 may be turned OFF by the switch controller 150 at a time (e.g., time $t_1$, FIGS. 3A-3I) appropriate for regulating the converter output voltage, $V_o$, to a pre-determined value $V_{out}$. The switch controller may turn switches Q1 and Q4 OFF sooner to reduce the duration of the energy-storage phase when it senses that $V_o$ is approaching, equal to, or exceeding $V_{out}$. Conversely, the switch controller may turn switches Q1 and Q4 OFF later, to increase the duration of the energy-storage phase when it senses that $V_o$ is less than $V_{out}$. The switch controller may in this way regulate the converter output voltage as the magnitudes of the input voltage and the load vary over their respective ranges.

Following the end of the energy-storage phase (after switches Q1 and Q4 are turned OFF), ZVS phase A, as described above, may be initiated by the switch controller 150 by delaying the turn ON of switches Q2, Q3, and Q5. The duration of ZVS phase A may be set, by circuitry (not shown) within the switch controller, to a fixed time period determined to be sufficient to enable ZVS of certain switches in the converter, or the interval may be terminated when circuitry (not shown) within the switch controller senses that some desired set of ZVS conditions has been achieved (e.g., voltage $V_2$ has fallen to a predetermined level, preferably at or near zero volts). Because of the square law relationship between capacitive energy-storage and voltage, substantial loss reduction may be achieved through partial charging and discharging of parasitic capacitances. As noted above, ZVS as used herein includes loss reduction through complete or partial charging and discharging of parasitic capacitances before turning a switch ON.

Following the end of ZVS phase A, the switch controller may turn switches Q2, Q3 and Q5 ON, initiating the energy-transfer phase. Circuitry in the switch controller (not shown) may sense when the secondary current, $I_S$, declines essentially to zero and turn switches Q3 and Q5 OFF and keep switch Q2 ON, terminating the energy-transfer phase and initiating ZVS phase B. The duration of ZVS phase B may be either set by circuitry (not shown) within the switch controller to a fixed time period that is sufficient to enable ZVS of certain switches in the converter, or the interval may be terminated when circuitry (not shown) within the switch controller senses that a desired set of ZVS conditions has been achieved (e.g., a reduction in the voltage $V_4$ to a predetermined level, preferably at or near zero volts).

Following the end of ZVS phase B, the switch controller may turn switch Q4 ON (resulting in both switches Q2 and Q4 being ON) shunting the primary winding and initiating the clamp phase. As noted above, in preferred embodiments the duration of the clamp phase may be held constant or it may be varied to control the output voltage or to keep the operating period constant. Depending upon the control strategy for the clamp phase duration, circuitry (not shown) within the switch controller 150 may turn switch Q2 OFF to terminate the clamp phase after a fixed or variable period (adjusted in response to variations in the output voltage or to variations in the converter operating period, $T_{M1}$, or the duration of individual phases). In embodiments having ZVS phase C, the switch controller may turn Q2 OFF while the remaining current is flowing in the shunted primary winding.

Following the end of the clamp phase (after switch Q2 is turned OFF), the switch controller 150 may initiate ZVS phase C by keeping switch Q4 ON. The duration of ZVS phase C may be either set, by circuitry (not shown) within the switch controller, to a fixed time period determined to be sufficient to enable ZVS of switches Q1 and Q2, or the interval may be terminated when circuitry (not shown) within the switch controller senses that a desired set of ZVS conditions has been achieved (e.g., voltage $V_2$ is essentially equal to the input source voltage, $V_I$). At the appropriate time, the switch controller may turn switch Q1 ON and keep Q4 ON, terminating ZVS phase C and initiating a new energy-storage phase and a new converter operating cycle.

It will be appreciated from the foregoing description that the above described timing architecture of the double-clamped ZVS buck-boost topology operating in the first operating mode supports ZVS operation of the primary switches and ZCS and ZVS operation of the secondary switch.

II. Mode 2 Operation.

Figure 2D:
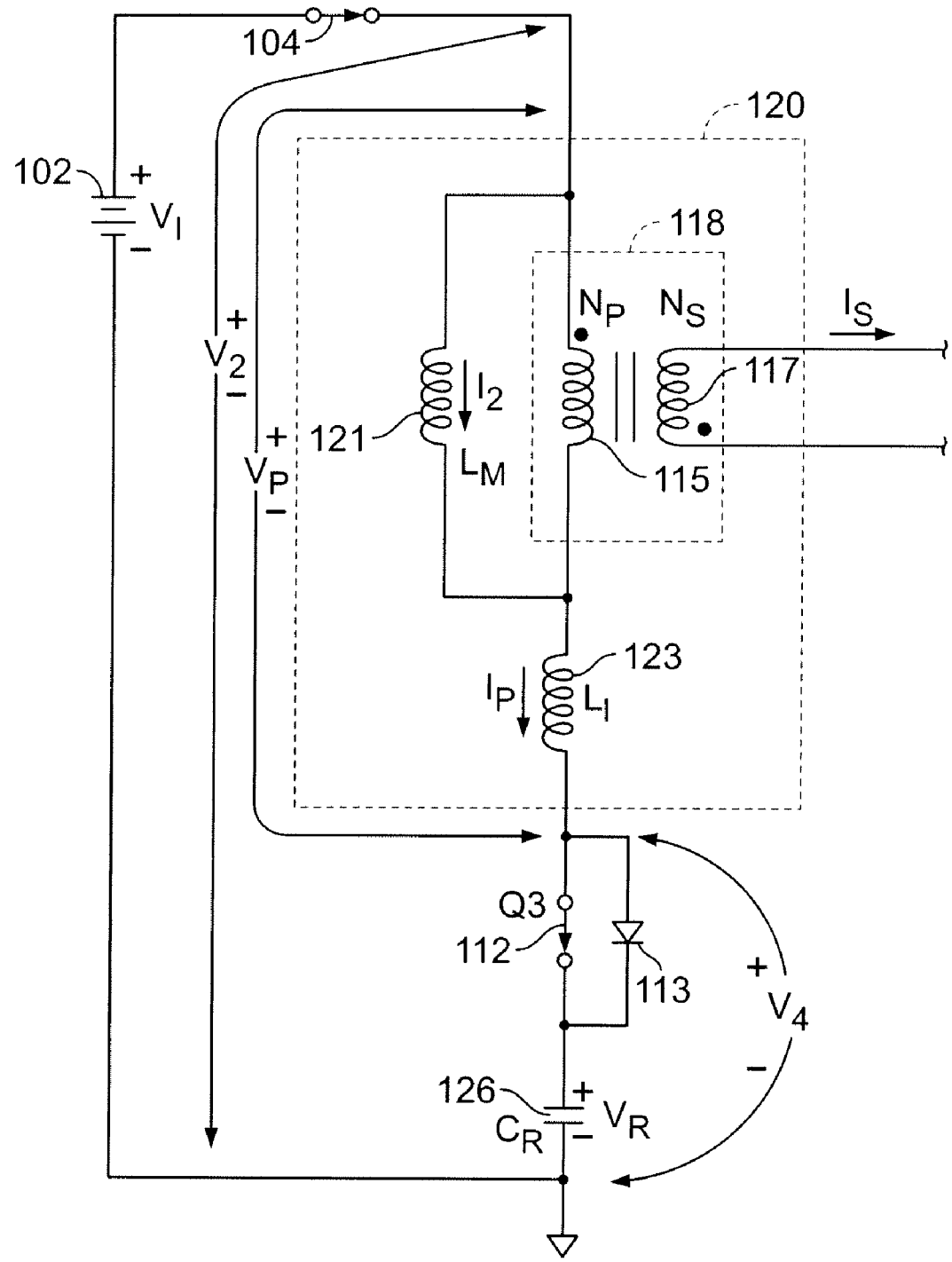

Operation of the converter 100 in the second operating mode ("Mode 2" or "M2") will be described with reference to the schematic diagrams in FIGS. 1 and 2A through 2C, previously described, and in FIG. 2D, and the waveforms in FIGS. 7A through 7I. A preferable structural feature of the converter operating in Mode 2 (as compared to Mode 1) is that a relatively large clamp capacitor $C_R$ 126 is preferably used in Mode 2 enabling the clamp capacitor to serve as both a voltage clamp and a primary-side energy storage element. However, the Mode 2 timing architecture may be used regardless of the size of the clamp capacitor.

A. Mode 2 Timing Architecture.

Waveforms for the timing architecture of the converter 100 of FIG. 1 operating in Mode 2 are shown in FIGS. 7A-7I. Mode 2 is similar to Mode 1 in the use of the energy-storage, energy-transfer, clamp, and several ZVS phases. However, ZVS phase A (Mode 1) may be divided into two separate ZVS phases in Mode 2: ZVS phase A1 and ZVS phase A2. Furthermore an additional "input-storage" phase may be added for a total of eight phases in Mode 2. As shown in FIGS. 7A-7I, the converter operating cycle in Mode 2 has a period, $T_{M2}$. For ease of comparison, the time labels $t_0$ through $t_5$ (from FIGS. 3A-3I) are also used in FIGS. 7A-7I to designate Mode 2 phase transitions that have counterparts in Mode 1. Additional time labels $t_c$, $t_x$, $t_y$, and $t_z$ have been added in FIGS. 7A-7I for additional transitions in Mode 2 as described below. For comparison, the timing architecture of Mode 1 may be thought of as a special case of the timing architecture of Mode 2.

1. Energy Storage Phase.

Operation of the basic converter during the energy-storage phase in Mode 2 is essentially the same as described above in Mode 1. At time $t_o$, switch Q4 may remain ON (FIG. 7D) from the previous converter operating cycle and switch Q1 may be turned ON (FIG. 7A), initiating the energy-storage phase. The primary current ramps up, storing energy in the transformer 120 until about time $t_1$.

2. ZVS Phase A1.

At time $t_1$ switch Q4 may be turned OFF (like Mode 1) but, switch Q1 may remain ON (unlike Mode 1). With Q4 OFF, the parasitic and discrete (if any) capacitances associated with node 132 are charged and discharged by the positive flow of primary current $I_P$ and the voltage $V_4$ rises toward the clamp voltage $V_R$ (like ZVS phase A of Mode 1). However, because switch Q1 remains ON in Mode 2, the voltage $V_2$ will not discharge towards zero volts during ZVS phase A1 as it would in the ZVS phase A of Mode 1, but instead remains equal to the input source $V_I$ in preparation for the following input-storage phase.

3. Input-Storage Phase.

At about time $t_x$, switch Q3 may be turned ON (under ZVS conditions), switch Q1 may remain ON, and switches Q2, Q4, and Q5 may remain OFF, initiating an input-storage phase. The equivalent circuit of the basic converter during the input-storage phase of Mode 2 is shown in FIG. 2D. During the input-storage phase, energy transfer occurs between the input source 102, the transformer 120, and the clamp capacitor 126.

The energy flow is dependent upon whether the input voltage, $V_I$, is above (i.e., buck converter mode) or below (i.e., boost converter mode) the clamp voltage, $V_R$ (which, as discussed above with respect to Mode 1, is essentially equal to the primary-reflected value of the output voltage, $V_o$, i.e. $V_R \approx V_o/N$). In buck mode, with $V_I > V_R$, energy will flow from the input source 102 to the clamp capacitor 126 via the primary winding 114, causing an increase in primary current $I_P$ and an increase during the input-storage phase in the energy stored in the transformer and the clamp capacitor. The waveform in FIG. 7F illustrates operation in buck mode, with the primary current increasing throughout the input-storage phase (between times $t_x$ and $t_y$) to a value $I_5 > I_1$ at a rate of change approximately equal to $(V_I - V_R)/L_M$. If the converter is operating in boost mode, with $V_I < V_R$, there will instead be a decrease in primary current $I_P$, and a decrease in the energy stored in the transformer (i.e., there will be a decrease in primary current, $I_P$, during the input-storage phase (i.e., in FIG. 7F, $I_5$ would be less than $I_1$)).

The value of the clamp capacitor, $C_R$, is presumed to be sufficiently large so that the increase or decrease in the energy stored in the clamp capacitor during an operating cycle (or, as discussed below, over many operating cycles) will not materially affect the value of the clamp voltage, $V_R$. Because of the relative values and polarities of the voltages during the input-storage phase, no secondary current flows during the input-storage phase (FIG. 7G).

The duration of the input-storage phase may be adjusted to control the amount of energy stored in the clamp capacitor 126 during a particular phase. Under certain operating conditions it may be desirable to minimize or even eliminate the input-storage phase during one or more converter operating cycles.

4. ZVS Phase A2.

At about time $t_y$, switch Q1 may be turned OFF and switch Q3 may remain ON, initiating ZVS phase A2 in Mode 2. During this phase the positive flow of primary current, $I_P$, charges and discharges the parasitic capacitances at node 130, reducing the voltage $V_2$, across switch Q2, towards zero (like ZVS phase A of Mode 1). As explained above in connection with ZVS phase A of Mode 1, the clamp voltage $V_R$ is essentially equal to the primary-reflected value of the output voltage, $V_o$, therefore, at time $t_2$, when the voltage $V_2$ approaches zero, the voltage across Q5 will also approach zero.

5. Energy Transfer Phase.

At about time $t_2$ switches Q2 and Q5 may be turned ON (under ZVS conditions following ZVS phase A2) and switch Q3 remains ON initiating the energy-transfer phase. The beginning of the energy-transfer phase in Mode 2 is similar to Mode 1. However, because of the relatively large clamp capacitor 126 in Mode 2, the resonant period, $T_{R2}$, of the circuit formed by the clamp capacitor $C_R$ and the leakage inductance $L_L$ 123, may be relatively long compared to the converter operating period $T_{M2}$ (unlike Mode 1). As a result, in Mode 2 the primary current, $I_P$, (FIG. 7F) declines smoothly after $t_2$, as magnetizing energy is transferred to the secondary circuitry and the secondary current $I_S$ (FIG. 7G) increases.

Unlike Mode 1, switch Q3 may remain ON after the primary current reverses at time $t_z$ to initiate energy transfer from the clamp capacitor 126 to the secondary circuitry. The length of the period between $t_z$ and $t_3$ will determine the amount of energy transferred to the secondary circuitry from the clamp capacitor. At time $t_3$, switch Q3 may be turned OFF with switch Q2 remaining ON (like Mode 1).

Figure 7A:
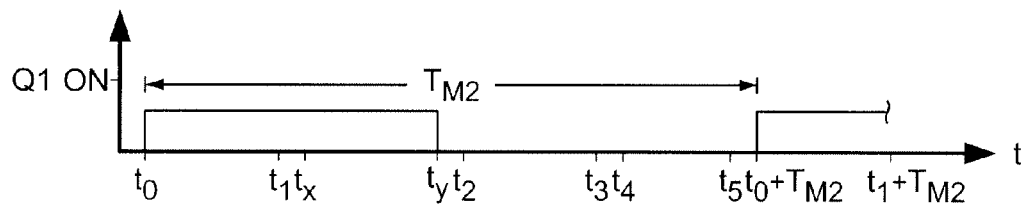
FIGS. 7A through 7I show operating waveforms for the converter of FIG. 1 operating in a second operating mode.
Figure 7B:
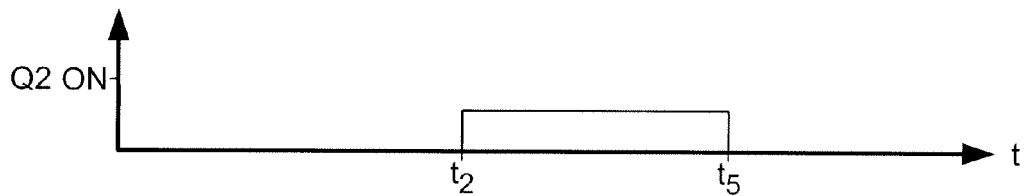
Figure 7C:
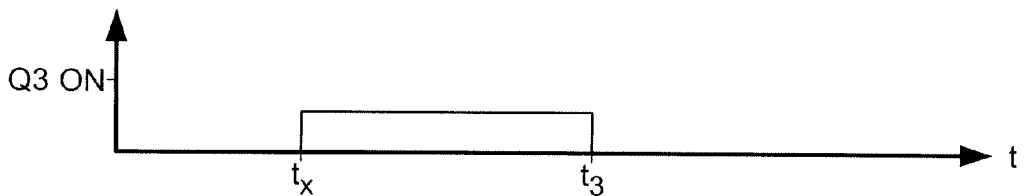
Figure 7D:
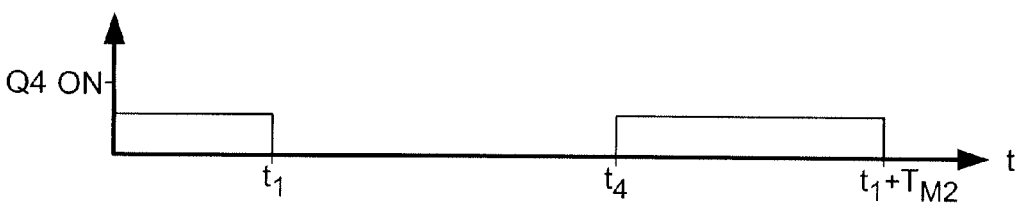
Figure 7E:
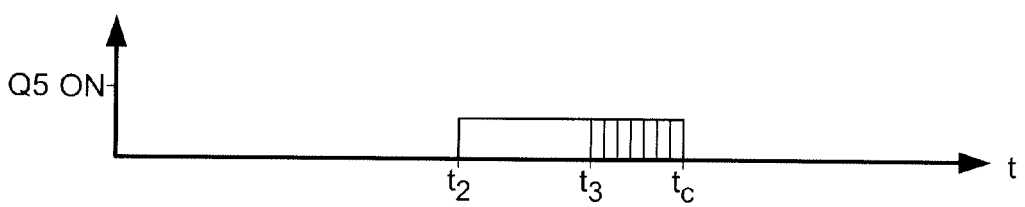
Figure 7F:
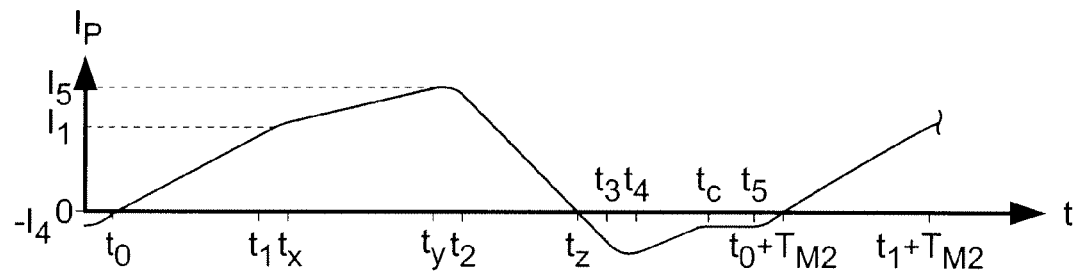
Figure 7G:
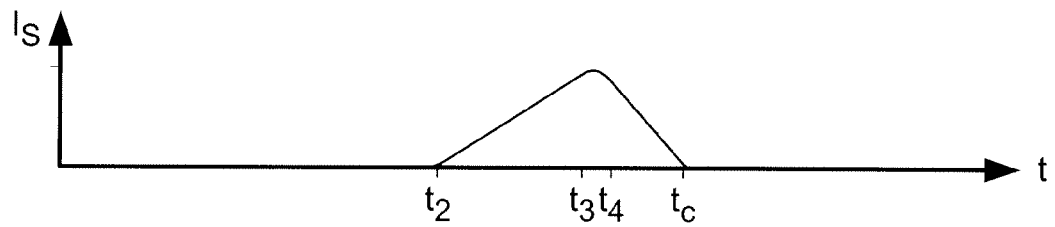
Figure 7H:
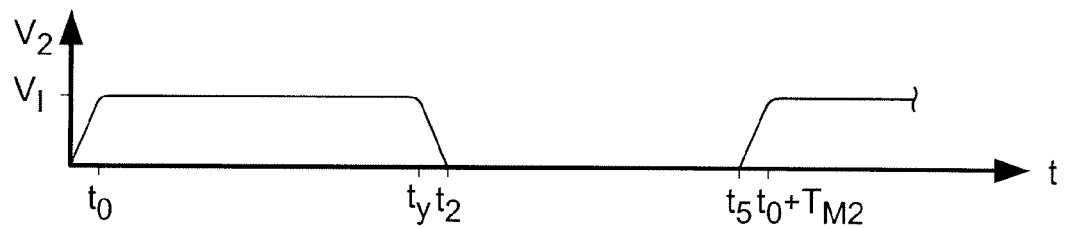
Figure 7I:
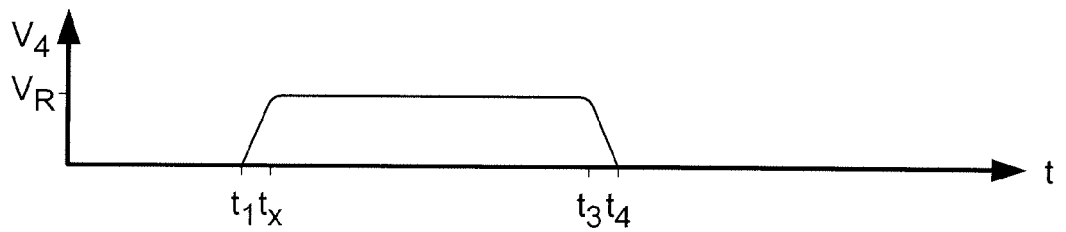

Switch Q5 may be turned OFF at time $t_3$ (like Mode 1) or at any time between time $t_3$ and time $t_c$, as illustrated by the dashed region in FIG. 7E. As discussed below, time $t_c$ may be defined as the time (shown during the clamp phase in FIG. 7G) that the secondary current declines to zero. Keeping Q5 ON until time $t_c$ will minimize loss associated with current flow in diode 109.

Under certain operating conditions it may be desirable to minimize or eliminate energy transfer from the clamp capacitor 126 to the secondary circuitry in which case switch Q3 may be turned OFF when the primary current goes to zero (like Mode 1) at time $t_z$.

6. ZVS Phase B.

ZVS phase B in Mode 2 is essentially the same as ZVS phase B in Mode 1, described above. At about time $t_3$, switch Q3 may be turned OFF and switch Q2 may remain ON, initiating ZVS phase B. During ZVS phase B, the negative flow of primary current, $I_P$, charges and discharges the parasitic and discrete (if any) capacitances at node 132, reducing the voltage, $V_4$, across switch Q4 towards zero, in preparation for turning ON switch Q4 in the clamp phase.

7. Clamp Phase.

Switch Q4 may be turned ON (under ZVS conditions following the third ZVS phase) at time $t_4$ with switch Q2 remaining ON, initiating the clamp phase. The clamp phase in the converter operating in Mode 2 is essentially the same as the clamp phase, described above, for the converter operating in Mode 1. However, due to energy storage in magnetizing and leakage inductances at the beginning of the clamp phase in Mode 2, secondary current may continue to flow during a portion of clamp phase, declining until it reaches zero at time $t_c$, as shown in FIG. 7G.

8. ZVS Phase C.

ZVS phase C in Mode 2 is essentially the same as ZVS phase C in Mode 1, described above. ZVS phase C is initiated at time $t_5$ by turning switch Q2 OFF with switch Q4 remaining ON. Assuming that the magnetizing current is essentially zero, or negative, at time $t_5$, the voltage across switch Q2 will rise toward the value of the input source $V_I$, preparing for ZVS turn ON of switch Q1 during the energy-storage phase of the next converter operating cycle at time $t_o + T_{M2}$.

B. Mode 2 Switch Controller.

The configuration of FIG. 5 also applies to a converter operating in Mode 2.

In Mode 2, the switch controller 150 has an additional degree of control freedom afforded by the addition of the input-storage phase. The input-storage phase may be used, for example, to store energy in the clamp capacitor during one or more converter operating cycles (during which energy may also be transferred to the secondary circuitry) for later transfer from the clamp capacitor to the secondary circuitry during one or more subsequent converter operating cycles. Energy may be transferred to the secondary circuitry and stored in the clamp capacitor during the same converter operating cycle. By including the input-storage phase, during which energy may be stored in the clamp capacitor at a relatively high voltage, Mode 2 enables uninterrupted and efficient operation of the converter during transient or periodic reductions of input voltage to low values, including zero.

Figure 6A:
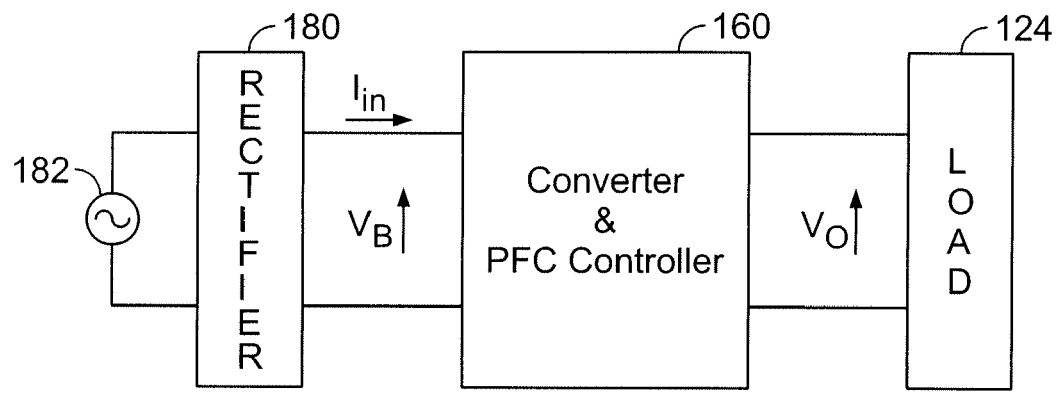
FIG. 6A shows a power factor correcting power converter.
Figure 6B:
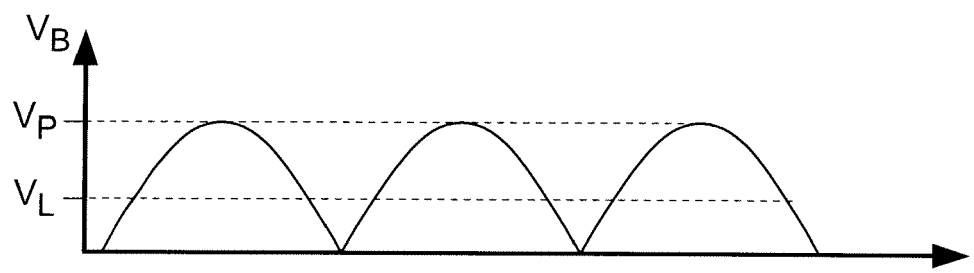
FIG. 6B shows a unipolar pulsating voltage.

One example of an application using Mode 2 is shown in FIG. 6A. An essentially sinusoidal AC source 182 delivers power to a rectifier 180, which, in the case of a full wave rectifier, delivers a unipolar pulsating voltage, $V_B$, as shown in FIG. 6B to the input of a power converter 160. The power converter 160 may include a controller (not shown in the Figure) to maintain the output voltage of the converter, $V_{out}$, at a pre-determined value and to also provide power factor correction ("PFC"). For PFC, the controller adjusts the amplitude and waveform of the input current, $I_{IN}$, drawn by the converter to essentially follow in phase the sinusoidal input voltage. The switch controller 150 may adjust the relative durations of the energy-storage and input-storage phases to store energy in the clamp capacitor 126, while also transferring energy to the secondary load, during times when the $V_{IN}$ is above $V_L$, and to use the energy stored in the clamp capacitor to supply energy to the load during times when $V_{IN}$ is below $V_L$.

Referring to FIG. 1, a first reconfigurable arrangement, comprising the basic converter 100 and additionally including storage capacitor $C_S$ 172 and switch Q6 170 and omitting switch Q7 174 and diode 182 (all shown in dashed lines), will be described. The first arrangement may be used to selectively configure the clamp capacitance to optimize for Mode 1 and Mode 2 operation. Therefore it is preferable, and the following discussion assumes that, the clamp capacitor $C_R$ is set to a relatively small value in the reconfigurable arrangement for efficient Mode 1 operation and the storage capacitor $C_S$ is set to a relatively large value for energy storage in Mode 2 operation. As an alternative to the arrangement shown in FIG. 1, a switch capable of blocking voltages of either polarity, for example, implemented using two MOSFET switches connected in series with the intrinsic diodes opposing, may be used for switch Q6.

With switch Q6 170 OFF, the effective clamp capacitance ($C_R$) is relatively small, eliminating large circulating currents and allowing the converter to operate efficiently in Mode 1 (or to operate in Mode 2 with a minimized input-storage phase). With switch Q6 170 ON, capacitors $C_R$ and $C_S$ are connected in parallel increasing the effective clamp capacitance and providing increased energy storage for operation in Mode 2. After energy is stored (using Mode 2) in the storage capacitor $C_S$ 172, switch Q6 may be turned OFF allowing the converter to operate in Mode 1 (or to operate in Mode 2 with a minimized input-storage phase). When the energy stored in storage capacitor $C_S$ 172 is required, switch Q6 may be turned ON and Mode 2 may be used to transfer energy from the storage capacitor $C_S$ 172 to the load.

A second reconfigurable arrangement 100B comprises the basic converter 100 and additionally includes storage capacitor $C_S$ 172, switch Q6 170, switch Q7 174, and optionally includes diode 182 all shown in dashed lines in FIG. 1. Switch Q7 should be capable of blocking voltages of either polarity and may be implemented, for example, using two MOSFET switches connected in series with the intrinsic diodes opposing. Like the first reconfigurable arrangement, it is preferable, and the following discussion assumes that, the clamp capacitor $C_R$ is set to a relatively small value in the second reconfigurable arrangement 100B for efficient Mode 1 operation and the storage capacitor $C_S$ is set to a relatively large value for storage in Mode 2 operation.

The second reconfigurable arrangement 100B allows the storage capacitor $C_S$ 172 to be connected to the converter input via switch Q7 174 to provide hold-up capability in the event that the input voltage $V_I$ drops below some threshold value, $V_L$. Switch Q7 174 when ON connects the storage capacitor to the input of the converter allowing the converter to continue operating. Optional diode 182 is illustrative of one way of preventing flow of energy from the storage capacitor $C_S$ 172 to the input source when switch Q7 174 is ON. In practice a rectifier (e.g., as shown in FIG. 1) or a switch (not shown) may be used.

With switch Q7 174 ON and switch Q6 OFF, the second reconfigurable arrangement 100B may be operated using the Mode 1 timing architecture. With switch Q7 174 OFF, the second reconfigurable arrangement 100B may be operated with switch Q6 170 either ON or OFF as described above in connection with the first reconfigurable arrangement. With switch Q6 ON, either the Mode 1 or Mode 2 timing architecture may be used. In mode 2 the storage capacitor $C_S$ 172 may be charged for subsequent hold-up operations (e.g., for PFC applications, as described above in connection with FIG. 6).

The configuration of FIG. 5 may also be used for the first and second reconfigurable arrangements with the switch controller additionally operating switches Q6 and Q7.

A number of embodiments of the invention have been described. Nevertheless, it will be understood that various modifications may be made without departing from the spirit and scope of the invention. For example, the Double-Clamped ZVS Buck-Boost converter may be applied without galvanic isolation between its secondary and primary windings. This is useful in applications where transformer isolation is not required but impedance transformation through the transformer turns ratio is desirable. As a further example, the relative configuration of switches Q1-Q5, or of a subset thereof, may be changed into a topologically equivalent configuration (e.g., in the converter of FIG. 1, the locations of switch Q3 and clamp capacitor 126 may be reversed, providing for ground-referenced drive of switch Q3). As a further example, the timing architecture may employ converter operating cycles that exclude some or all of the above described ZVS phases. The duration of the clamp phase may vary from a small fraction, e.g. 10%, of the converter operating period at heavy loads to a large fraction, e.g. as high as 80%, of the converter operating period at light loads. The input-storage phase of Mode 2 may be selectively minimized or eliminated under certain operating conditions. Similarly, the portion of the energy-transfer phase after $t_z$ in Mode 2 may also be selectively minimized or eliminated under certain operating conditions. Relatively large values of clamp capacitance 126 may be used in the second reconfigurable arrangement.

Accordingly, other embodiments are within the scope of the following claims.

What is claimed is:

1. Apparatus for converting power from an input source at an input voltage for delivery to a load at an output voltage, the apparatus comprising,
   a transformer having a primary winding and a secondary winding,
   secondary circuit elements connected to the secondary winding adapted to deliver power to the load at the output voltage,
   a first switch connected between a first terminal of the input source and a first terminal of the primary winding,
   a second switch connected between a second terminal of the input source and the first terminal of the primary winding,
   a clamp circuit including a clamp capacitor connected in series with a clamp switch to provide a current path between a first terminal and a second terminal through the clamp capacitor when the clamp switch is closed and to open the current path through the clamp capacitor when the clamp switch is open;
   a fixed connection between the first terminal of the clamp circuit and a second terminal of the primary winding;
   a fixed connection between the second terminal of the clamp circuit and the input source;
   a fourth switch connected between the second terminal of the input source and the second terminal of the primary winding, and
   a switch controller adapted to operate the switches in a series of converter operating cycles, each converter operating cycle comprising (a) an energy-storage phase during which: the primary winding is connected to the input source by conduction of the first and fourth switches, energy is transferred from the input source to the transformer, and current in the secondary winding is essentially zero.

2. The apparatus of claim 1 wherein each converter operating cycle further comprises:
   (b) an energy-transfer phase characterized by a transfer of energy from the transformer to the load and by a transfer of energy between the transformer and the clamp capacitor and by conduction of the second and clamp switches.

3. Apparatus for converting power from an input source at an input voltage for delivery to a load at an output voltage, the apparatus comprising,
   a transformer having a primary winding and a secondary winding,
   secondary circuit elements connected to the secondary winding adapted to deliver power to the load at the output voltage,
   a first switch connected between a first terminal of the input source and a first terminal of the primary winding,
   a second switch connected between a second terminal of the input source and the first terminal of the primary winding,
   a clamp circuit including a clamp capacitor connected in series with a clamp switch to provide a current path between a first terminal and a second terminal through the clamp capacitor when the clamp switch is closed and to open the current path through the clamp capacitor when the clamp switch is open;
   a fixed connection between the first terminal of the clamp circuit and a second terminal of the primary winding;
   a fixed connection between the second terminal of the clamp circuit and the input source;
   a fourth switch connected between the second terminal of the input source and the second terminal of the primary winding, and
   a switch controller adapted to operate the switches in a series of converter operating cycles, each converter operating cycle comprising
   (a) an energy-storage phase during which: the primary winding is connected to the input source by conduction of the first and fourth switches, energy is transferred from the input source to the transformer,
   (b) an energy-transfer phase characterized by a transfer of energy from the transformer to the load and by a transfer of energy between the transformer and the clamp capacitor and by conduction of the second and clamp switches; and
   wherein the secondary circuit elements comprise rectification circuitry connected between the secondary winding and the load, and wherein the rectification circuitry conducts current during the energy-transfer phase and blocks current throughout the energy-storage phase.

4. Apparatus for converting power from an input source at an input voltage for delivery to a load at an output voltage, the apparatus comprising,
   a transformer having a primary winding and a secondary winding,
   secondary circuit elements connected to the secondary winding adapted to deliver power to the load at the output voltage,
   a first switch connected between a first terminal of the input source and a first terminal of the primary winding,
   a second switch connected between a second terminal of the input source and the first terminal of the primary winding,
   a clamp circuit including a clamp capacitor connected in series with a clamp switch to provide a current path between a first terminal and a second terminal through the clamp capacitor when the clamp switch is closed and to open the current path through the clamp capacitor when the clamp switch is open;
   a fixed connection between the first terminal of the clamp circuit and a second terminal of the primary winding;
   a fixed connection between the second terminal of the clamp circuit and the input source;
   a fourth switch connected between the second terminal of the input source and the second terminal of the primary winding, and a switch controller adapted to operate the switches in a series of converter operating cycles, each converter operating cycle comprising
  (a) an energy-storage phase during which: the primary winding is connected to the input source by conduction of the first and fourth switches, energy is transferred from the input source to the transformer, and
  (b) an energy-transfer phase characterized by a transfer of energy from the transformer to the load and by a transfer of energy between the transformer and the clamp capacitor and by conduction of the second and clamp switches;
wherein an average value of primary current flows in the primary winding, the average value of primary current having a polarity and being taken over the duration of the energy-storage phase, and
each converter operating cycle further comprises:
  (c) a clamp phase during which the primary winding of the transformer is clamped by conduction of the second and fourth switches, the clamp phase being characterized by an essentially zero voltage across the primary winding and an average value of current flowing in the primary winding, the average value of current being taken over the duration of the clamp phase and having a polarity opposite of the polarity of the average value of current during the energy-storage phase immediately preceding the clamp phase.

5. Apparatus for converting power from an input source at an input voltage for delivery to a load at an output voltage, the apparatus comprising,
  a transformer having a primary winding and a secondary winding,
  secondary circuit elements connected to the secondary winding adapted to deliver power to the load at the output voltage,
  a first switch connected between a first terminal of the input source and a first terminal of the primary winding,
  a second switch connected between a second terminal of the input source and the first terminal of the primary winding,
  a clamp circuit including a clamp capacitor connected in series with a clamp switch to provide a current path between a first terminal and a second terminal through the clamp capacitor when the clamp switch is closed and to open the current path through the clamp capacitor when the clamp switch is open;
  a fixed connection between the first terminal of the clamp circuit and a second terminal of the primary winding;
  a fixed connection between the second terminal of the clamp circuit and the input source;
  a fourth switch connected between the second terminal of the input source and the second terminal of the primary winding,
  a switch controller adapted to operate the switches in a series of converter operating cycles, each converter operating cycle comprising
    (a) an energy-storage phase during which: the primary winding is connected to the input source by conduction of the first and fourth switches, energy is transferred from the input source to the transformer,
    (b) an energy-transfer phase characterized by a transfer of energy from the transformer to the load and by a transfer of energy between the transformer and the clamp capacitor and by conduction of the second and clamp switches, and
    (c) a clamp phase during which the primary winding of the transformer is clamped by conduction of the second and fourth switches, the clamp phase being characterized by essentially zero voltage across said primary winding.

6. The apparatus of claim 2 wherein each converter operating cycle further comprises a zero-voltage switching phase at the end of the energy-storage phase.

7. The apparatus of claim 2 wherein each converter operating cycle further comprises a zero-voltage switching phase at the end of the energy-transfer phase.

8. The apparatus of claim 4 or 5 wherein each converter operating cycle further comprises a zero-voltage switching phase at the end of the clamp phase.

9. A method of converting power from an input source at an input voltage for delivery to a load at an output voltage, via a transformer having a primary winding and a secondary winding, the method comprising:
  providing secondary circuit elements connected to the secondary winding adapted to deliver power to the load at the output voltage,
  providing a first switch connected between a first terminal of the input source and a first terminal of the primary winding,
  providing a second switch connected between a second terminal of the input source and the first terminal of the primary winding,
  providing a clamp circuit including a clamp capacitor connected in series with a clamp switch to provide a current path between a first terminal and a second terminal through the clamp capacitor when the clamp switch is closed and to open the current path through the clamp capacitor when the clamp switch is open;
  providing a fixed connection between the first terminal of the clamp circuit and a second terminal of the primary winding;
  providing a fixed connection between the second terminal of the clamp circuit and the input source;
  providing a fourth switch connected between the second terminal of the input source and the second terminal of the primary winding,
  operating the switches in a series of converter operating cycles,
  (a) establishing an energy-storage phase of the converter operating cycles during which the primary winding is connected to the input source by conduction of the first and fourth switches, the energy-storage phase being characterized by a transfer of energy from the input source to the transformer, and
  essentially preventing current flow in the secondary winding throughout the energy-storage phase.

10. The method of claim 9 further comprising:
  (b) establishing an energy-transfer phase of the converter operating cycles characterized by a transfer of energy from the transformer to the load, by a transfer of energy between the transformer and the clamp capacitor, and by conduction of the second and clamp switches.

11. The method of claim 10 wherein the secondary circuit elements comprise rectification circuitry connected between the secondary winding and the load, and further comprising configuring the rectification circuitry to conduct current during the energy-transfer phase and to block current throughout the energy-storage phase.

12. The method of claim 10 wherein: an average value of primary current flows in the primary winding, the average value of primary current having a polarity and being taken over the duration of the energy-storage phase, and further comprising:
(c) establishing a clamp phase of the converter operating cycles during which the primary winding of the transformer is clamped by conduction of the second and fourth switches, the clamp phase being characterized by an essentially zero voltage across the primary winding and an average value of current flowing in the primary winding, the average value of current being taken over the duration of the clamp phase and having a polarity opposite of the polarity of the average value of current during the energy-storage phase immediately preceding the clamp phase.

13. The method of claim 10 further comprising:
establishing a clamp phase of the converter operating cycles during which the primary winding of the transformer is clamped by conduction of the second and fourth switches, the clamp phase being characterized by essentially zero voltage across said primary winding.

14. The method of claim 10 further comprising establishing a zero-voltage switching phase of the converter operating cycles at the end of the energy-storage phase.

15. The method of claim 10 further comprising establishing a zero-voltage switching phase of the converter operating cycles at the end of the energy-transfer phase.

16. The method of claim 12 or 13 further comprising establishing a zero voltage switching phase of the converter operating cycles at the end of the clamp phase.

17. The method of claim 11 wherein the clamp circuit is connected to the second terminal of the input source.

18. The apparatus of claim 3 wherein the clamp circuit is connected to the second terminal of the input source.

* * * * *

UNITED STATES PATENT AND TRADEMARK OFFICE
CERTIFICATE OF CORRECTION

| | |
|---|---|
| PATENT NO. | : 7,920,391 B1 |
| APPLICATION NO. | : 12/501112 |
| DATED | : April 5, 2011 |
| INVENTOR(S) | : Patrizio Vinciarelli |

It is certified that error appears in the above-identified patent and that said Letters Patent is hereby corrected as shown below:

Title Page 2, Col. 1, under OTHER PUBLICATION, line 2, delete "Conversino," and insert -- Conversion," --.

Title Page 2, Col. 1, under OTHER PUBLICATION, line 4, delete "Blackburg," and insert -- Blacksburg," --.

Title Page 2, Col. 2, under OTHER PUBLICATION, line 9, delete "Steigerwals," and insert -- Steigerwald," --.

Signed and Sealed this
Fourteenth Day of June, 2011

David J. Kappos
*Director of the United States Patent and Trademark Office*